(12) United States Patent
Erett et al.

(10) Patent No.: US 12,169,508 B2
(45) Date of Patent: Dec. 17, 2024

(54) SYSTEM AND METHOD FOR ENTITY DISAMBIGUATION FOR CUSTOMER RELATIONSHIP MANAGEMENT

(71) Applicant: Cognism Limited, Richmond (GB)

(72) Inventors: Johannes Julien Frederik Erett, London (GB); James A Hodson, El Cerrito, CA (US)

(73) Assignee: Cognism Limited, Richmond (GB)

( * ) Notice: Subject to any disclaimer, the term of this patent is extended or adjusted under 35 U.S.C. 154(b) by 60 days.

(21) Appl. No.: 17/481,866

(22) Filed: Sep. 22, 2021

(65) Prior Publication Data

US 2022/0114198 A1  Apr. 14, 2022

Related U.S. Application Data

(60) Provisional application No. 63/081,761, filed on Sep. 22, 2020.

(51) Int. Cl.
*G06F 16/28* (2019.01)
*G06F 7/14* (2006.01)
(Continued)

(52) U.S. Cl.
CPC ............. *G06F 16/285* (2019.01); *G06F 7/14* (2013.01); *G06F 16/245* (2019.01); *G06N 5/01* (2023.01);
(Continued)

(58) Field of Classification Search
None
See application file for complete search history.

(56) References Cited

U.S. PATENT DOCUMENTS 8,849,813 B1 * 9/2014 Iyer .................. G06F 16/95
707/728
9,779,363 B1 * 10/2017 Hansen .............. G06F 16/285
(Continued)

OTHER PUBLICATIONS

David Pinto; Table Extraction Using Conditional Random Fields; 2003;ACM; pp. 235-242.*

*Primary Examiner* — Mariela Reyes
*Assistant Examiner* — Ja M
(74) *Attorney, Agent, or Firm* — Dickinson Wright PLLC; Hector A. Agdeppa

(57) ABSTRACT

Systems and methods for disambiguating company profiles are disclosed. The system builds a database of candidate companies with timed attributes. The system further ingests timed company metadata using a PostgreSQL database. The system disambiguates location and geocoding by matching text patterns and cross-referencing one or more identified location components against one or more geocode databases and classifies and disambiguates company name component from a company name associated with the company using a conditional random field (CRF) model. Further, the system disambiguates employee attributes using a Latent Dirichlet Allocation (LDA) topic model algorithm and train a tree model for pre-selection of candidate companies for the company. The system trains a similarity model for comparison of the candidate companies and in response to a determination that two given candidate companies are same merge the company profiles associated with the given candidate companies.

1 Claim, 17 Drawing Sheets

(51) Int. Cl.
*G06F 16/245* (2019.01)
*G06N 5/01* (2023.01)
*G06N 20/20* (2019.01)
*G06Q 10/0631* (2023.01)
*G06Q 30/01* (2023.01)
*G06Q 30/015* (2023.01)

(52) U.S. Cl.
CPC ..... *G06N 20/20* (2019.01); *G06Q 10/063112* (2013.01); *G06Q 30/01* (2013.01); *G06Q 30/015* (2023.01)

(56) References Cited

U.S. PATENT DOCUMENTS

2013/0262501 A1\* 10/2013 Kuchmann-Beauger ............... G06F 16/24535
707/769
2019/0327732 A1\* 10/2019 Yoon ................. H04W 72/23
2020/0081917 A1\* 3/2020 Hirmer ............... G06F 16/9537

\* cited by examiner

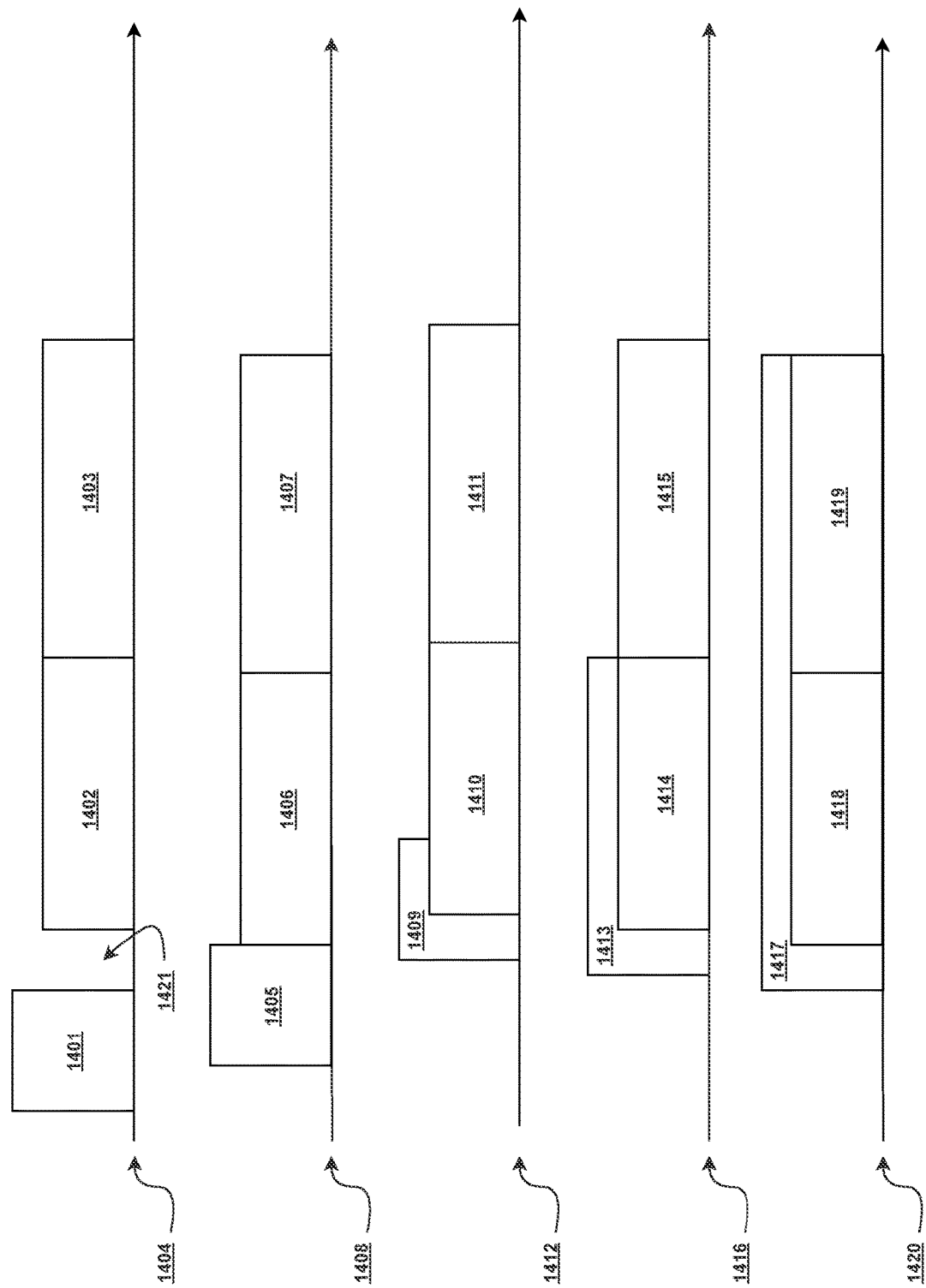

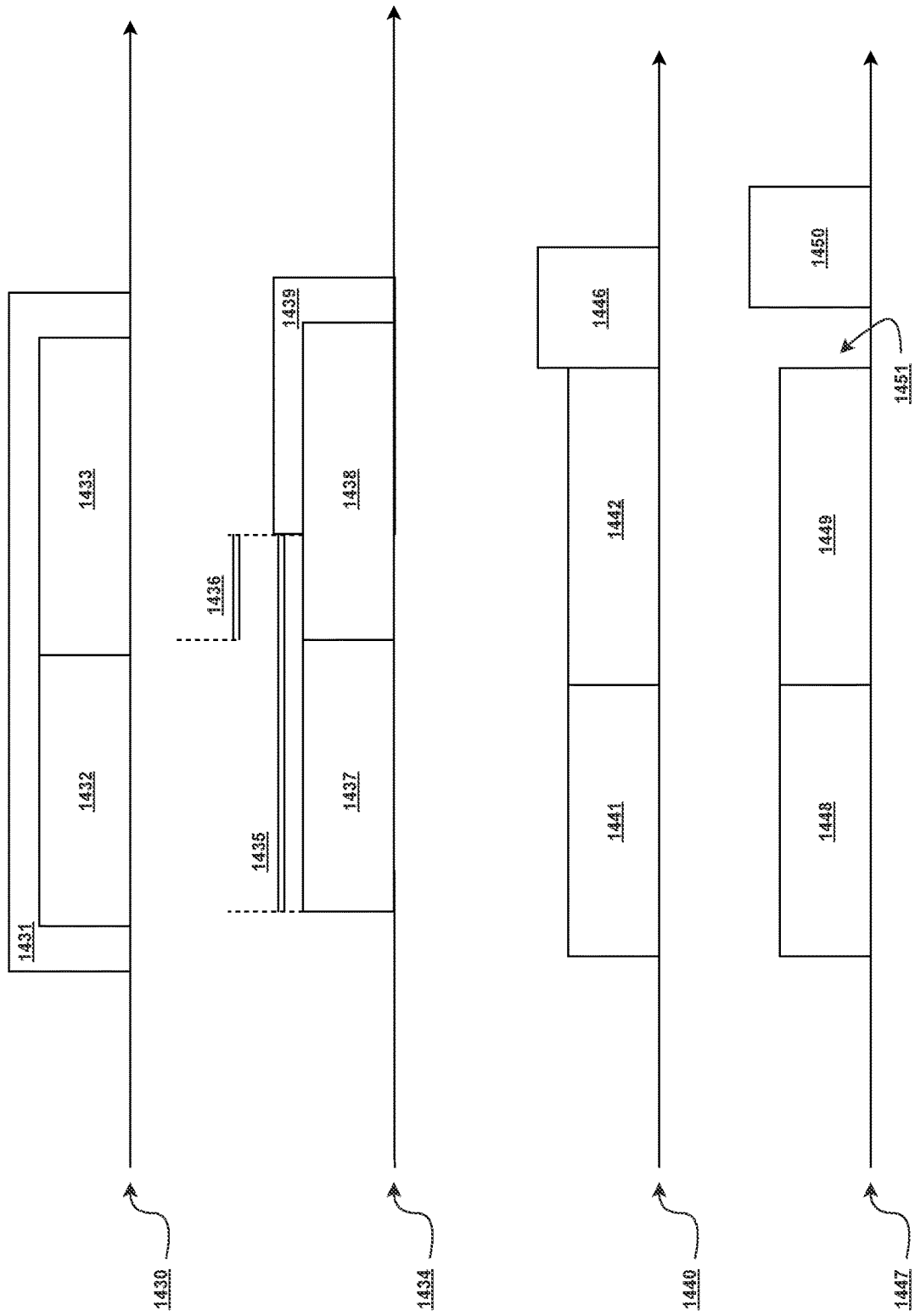

SYSTEM AND METHOD FOR ENTITY DISAMBIGUATION FOR CUSTOMER RELATIONSHIP MANAGEMENT

CROSS-REFERENCE TO RELATED APPLICATIONS

This application claims the benefit of, and priority to U.S. provisional application 63/081,761 titled, "SYSTEM AND METHOD FOR ENTITY DISAMBIGUATION" filed on Sep. 22, 2020, the entire specification of which is incorporated herein by reference.

BACKGROUND OF THE INVENTION

Field of the Art

The disclosure relates to the field of research fields of named entity recognition and entity linking.

Discussion of the State of the Art

Named Entity Recognition and Classification (NERC) is a process of recognizing information units like names, including person, organization and location names, and numeric expressions including time, date, money and percent expressions from unstructured text.

Entity linking is the task to link entity mentions in text with their corresponding entities in a knowledge base. Potential applications include information extraction, information retrieval, and knowledge base population. However, this task is challenging due to name variations and entity ambiguity.

Currently entity linking usually deals with a static "view" of an entity. But most entities (like people or companies) change dynamically over time.

This invention allows to disambiguate and to link dynamically changing entities. The goal is to retrieve a knowledge base of unambiguous, dynamically changing entities (here companies and people) from ambiguous input data (here CV employment records). The invention overcomes the "chicken and egg" problem of linking to- and building the knowledge base at the same time.

It also accounts for ambiguity in the input data. For a trained human it might be obvious to know from previous knowledge that "Google" and "Alphabet" could lead in fact to the same company, at least for employment records from October 2015 or later. But our system cannot depend on previous knowledge or "common sense".

DEL-KGG overcomes these challenges by adding multiple versions ("candidate records") of potentially the same entity in the knowledge base (like for multiple name variations of a company) in a first step and by adding additional attributes of the employment record (like location, employee skills, start date, end date) to the candidate record.

In a second step DEL-KGG finds similar candidate records and predicts, if they are in fact the same entity based on their attribute value distribution at specific points in time.

SUMMARY OF THE INVENTION

Accordingly, the inventor has conceived and reduced to practice, in a preferred embodiment of the invention, the software consists of components for (company-) data ingestion, attribute disambiguation, data storage, feature extraction, model training and prediction (which candidate companies should be merged). Software components are developed in Python but could be implemented in other languages. The input data is read from text files with records in json or csv format, but other formats could be used. PostgreSQL 11.2 is used as a database, but other databases could be used. We consider a relational database as preferable, because large amounts of records have to be queried based on pre-defined fields/attributes. A crucial component is what we call TimeSlices which manages changing attribute values over time. Instead of storing values with a start- and optional end date, the whole TimeSlices object has a start date, and each unchanged set of values is stored within a "Slice" with a given number of months of validity. This translates the time variable into a simple chain of integers, which makes the data retrieval computationally very efficient. For our use case, we have chosen "months' as a sufficient scale, but smaller or larger timescales could as well be used. Other ways of handling changed values over time could as well be used but might potentially be less efficient. The TimeSlices component in itself, as well as other software components are not the key aspect of this invention. It is their combination within the described process.

BuildCompanies: A class to read in, normalize and structure company information from files, initiate Company objects and add their attributes.

Geocodes: A class to geocode given locations asynchronously and deliver latitude and longitude for requested locations.

Company: Company objects hold a variety of company attributes and methods. 17 of the currently 23 company attributes are organized in TimeSlices objects, that allow to track these attributes over time.

TimeSlices: A TimeSlices object holds information about a company attribute over time. It is optimized on fast data retrieval and minimization of storage overhead. Therefore, it is implemented in a proprietary way and doesn't require the storage of Python datetime objects.

_Slice: A class to organize data that is valid for a specific time period.

Company_Items: An abstract class to bundle all the classes that represent company attributes, such as Location, StockSymbol, etc.

+All the specific Company_Items sub-classes, as illustrated in FIG. 6: CompanyItems sub-classes.

The figure shows the basic structure of the most important objects within the company module. Each box represents a class and includes the class name, followed by its data attributes and methods. The numbers on each link represent the valid number of connected objects of each class. For example, a BuildCompanies object can produce a limitless (positive) amount of Company objects. Each Company object is linked to 17 TimeSlices objects and each TimeSlices object to exactly one Company object:

The figures show classes that represent company attributes. CompanyItems itself is an abstract class to group all these sub-classes whose objects in fact represent company items and are organised in TimeSlices objects:

The figures show examples to illustrate how the timed company attributes are structured. If a company attribute is time-sensitive, it is organised in a TimeSlices object. It is exemplified here by some office locations of one company. A TimeSlices object contains a list of indices and a list of _Slices objects. Each index represents how many months the corresponding _Slice object is valid for. Each _Slice object can contain multiple Location objects:

If a new location is added to the company for a specific time range, the TimeSlices class automates to build the new indices and _Slice objects. This may include:

To insert additional, empty _Slice objects, if the time range for the new location ends before the former start month of the TimeSlices object or starts after the former end month.

To divide old slices and the including locations, if the new time range starts or ends within an old slice's time range, spans over multiple old time ranges, starts earlier, ends later, etc.

To account for specifics of certain company attributes. For example, Location objects include a counter to keep track of the number of employees that we map to each location. Other company items have their own specific behavior.

Process and Further Description of Software Components

The figures show the process of building, linking and disambiguating the knowledge base.

Build Database of Candidate Companies with Timed Attributes

In this step, the company database gets populated with initial data. The companies in the database are considered as "candidate companies". This means, that companies with for example slightly different name variations are treated as different companies for now. Disambiguating and merging those companies happens at a later stage.

The Software reads the input textfiles of company records in csv and json format. Other input formats could be used.

It ingests: —Timed company metadata like:
Stock symbols, each of which is linked to a given company in a given time frame
Official company headcount reporting, each of which are linked to a given company on a given point in time, or an average over a given time frame
General Company Metadata like
Company website domains and URLs
Register Ids
Company data from employment records This data is also time sensitive based on a given start- and optional end-date per employment record. Records include:
Job titles
Skills
Location of employment
Degree In a preferred embodiment, the software builds each candidate company as a python object with attributes shown in the figures. Time sensitive attributes are managed within TimeSlices Objects, shown in the figures.

JSON or fully normalized representations of the candidate companies get stored in the PostgreSQL database.

Attribute Disambiguation: Attribute disambiguation is defined as a separate step, to give a more structured overview. But the disambiguation if attribute values could as well happen directly while ingesting the company data in step 1.

It may include: Location disambiguation

Implemented with regular expressions to match text patterns and cross-reference identified location components against GeoNames open source location database: Company Name Component Classification and Disambiguation This includes to identify and classify components of company names. For example:
"Rhenus—Forwarding and Logistics Ltd"
"Rhenus": base name
-: connector
"Forwarding and Logistics": function/industry
"Ltd": legal identifier In our preferred implementation we use a CRF algorithm, implemented in the open source library "PYCRFSUITE"

Disambiguation of Employee Attributes: For example mapping skills to skill topics, implemented with an LDA (Latent Dirichlet Allocation) topic modeling algorithm.

Feature Extraction: In this step the timed company attributes get translated into numeric elements within a feature vector per company Training of Tree Model for Candidate Pre-Selection: Based on manually annotated ("supervised") training examples, a tree model is trained to identify a pre-selection of candidate companies for each company, that could potentially be the same company. Possible used algorithms include Random Forrest, Gradient Boosting or Decision Tree.

Training of Similarity Model for Candidate Comparison: Based on the pre-selection of Step 4 as well as given training examples, a model is trained to predict, if 2 given candidate companies are actually the same and should be merged. Possible algorithms include different Regression Algorithms, Neural Networks or Vector Similarity Algorithms like Euclidean Distance, paired with a learned threshold.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

Figure 13A:
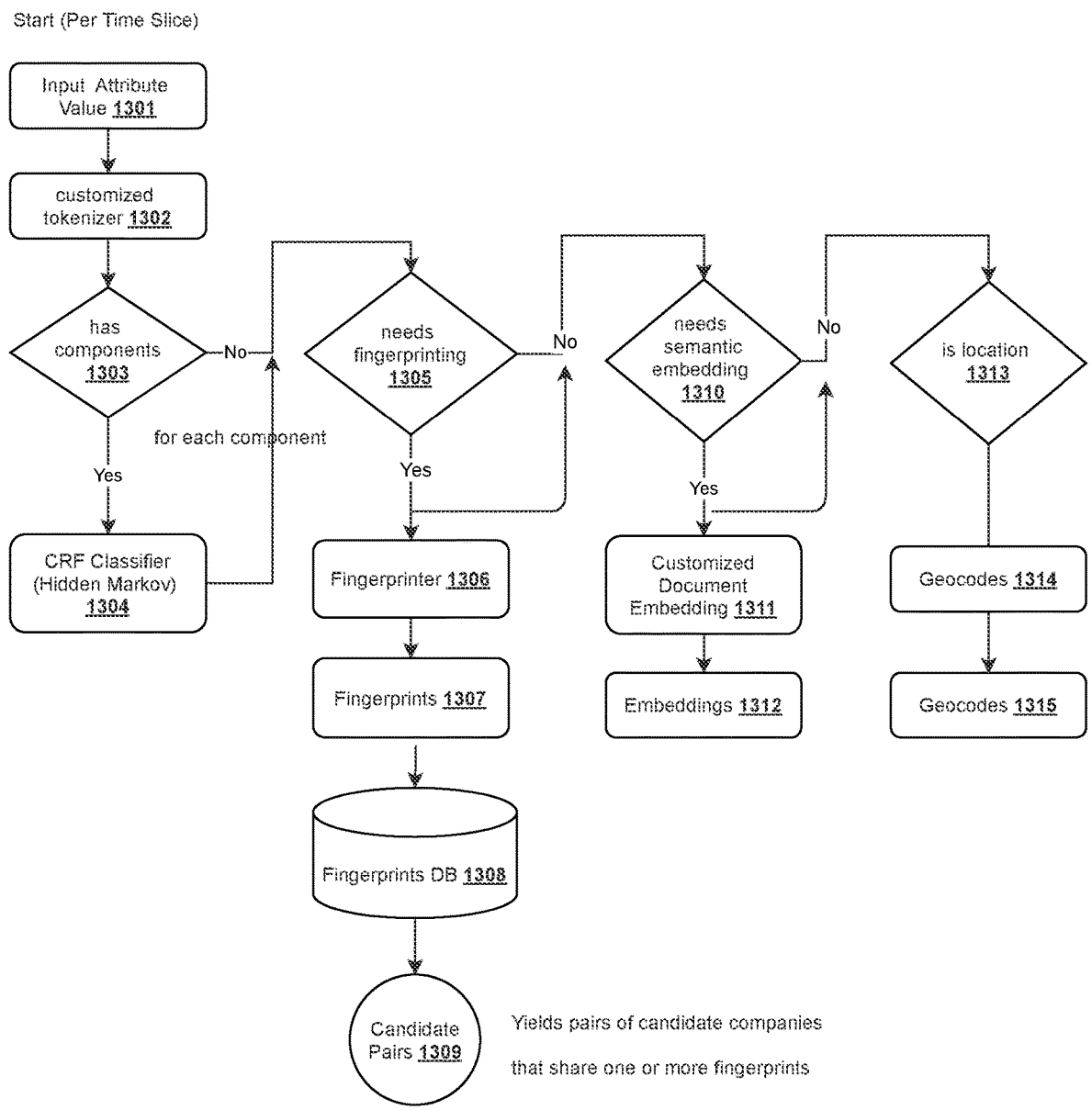
Figure 13B:
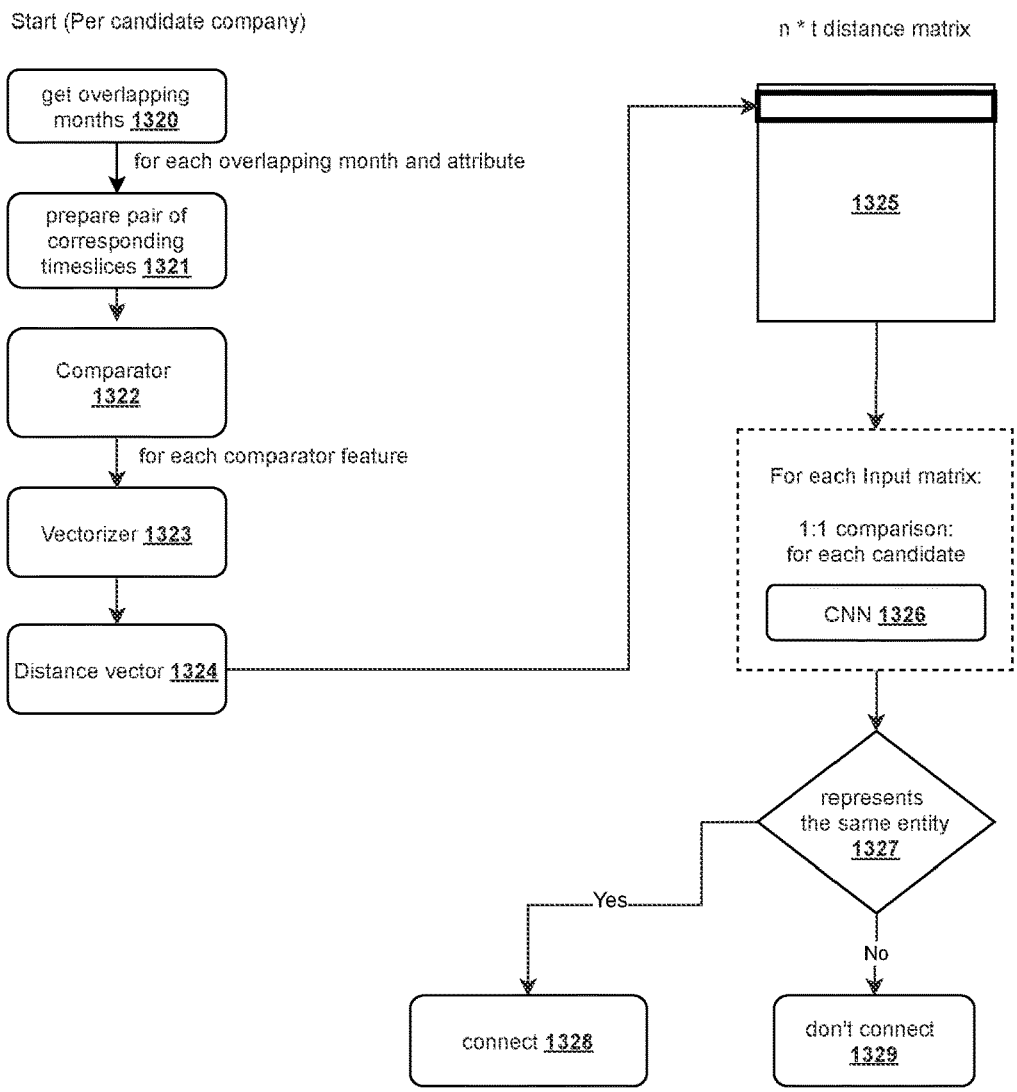

FIGS. 13A-B illustrate a flow diagram for a method for tokenization and classification, according to a preferred embodiment of the invention.

FIG. 14A-B are block diagrams illustrating a plurality of entity elements time-sliced over a period of time, in accordance with a preferred embodiment of the invention.

DETAILED DESCRIPTION

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
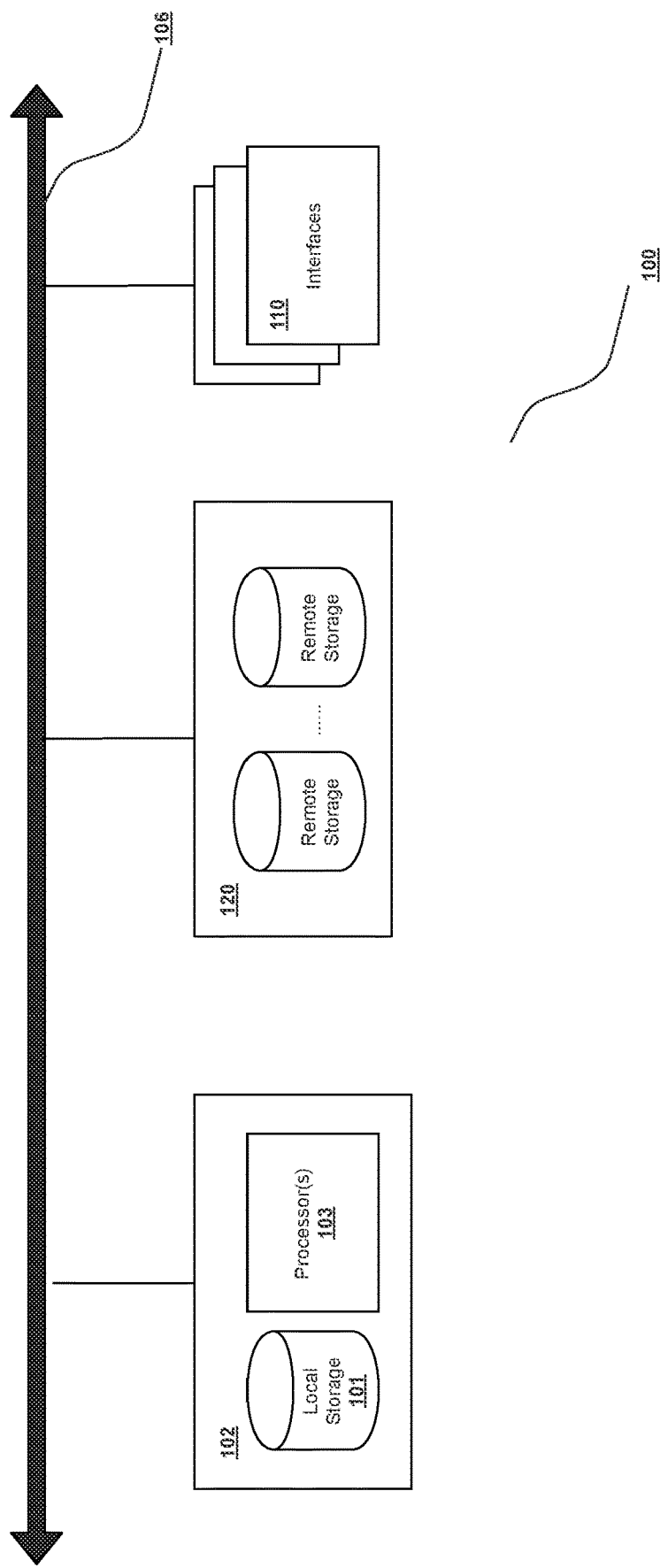
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT', PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
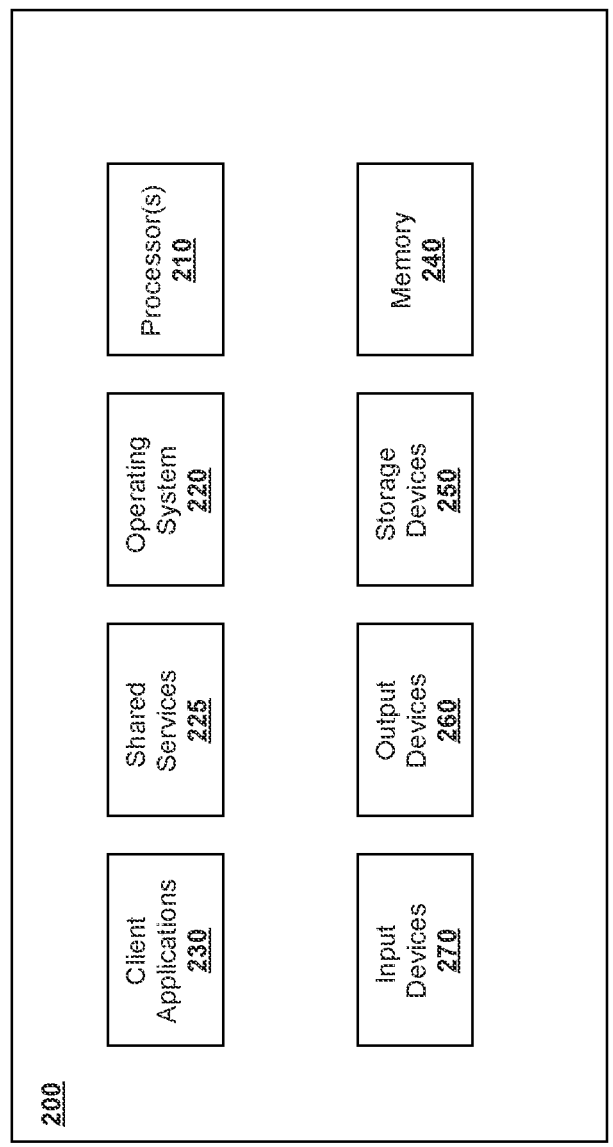
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
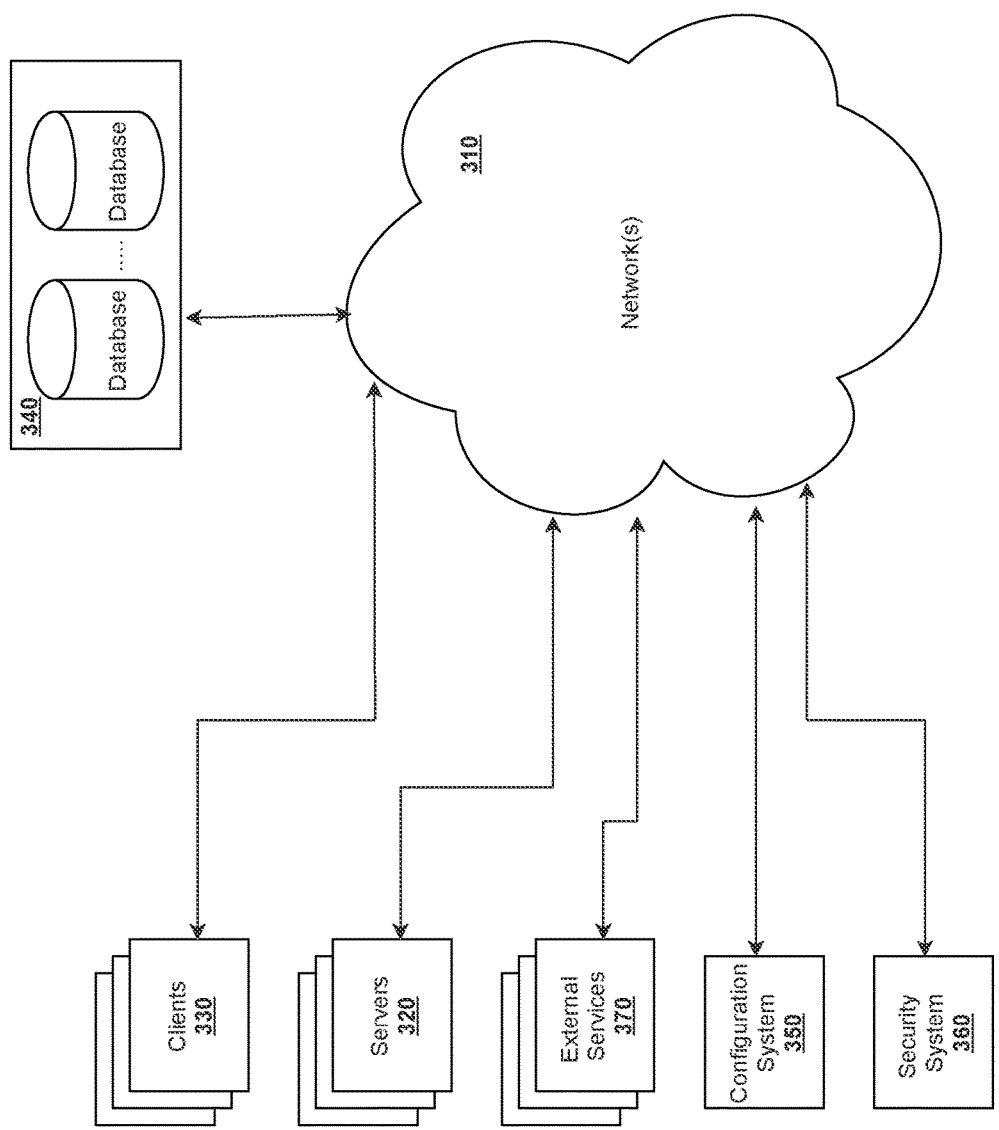
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4A:
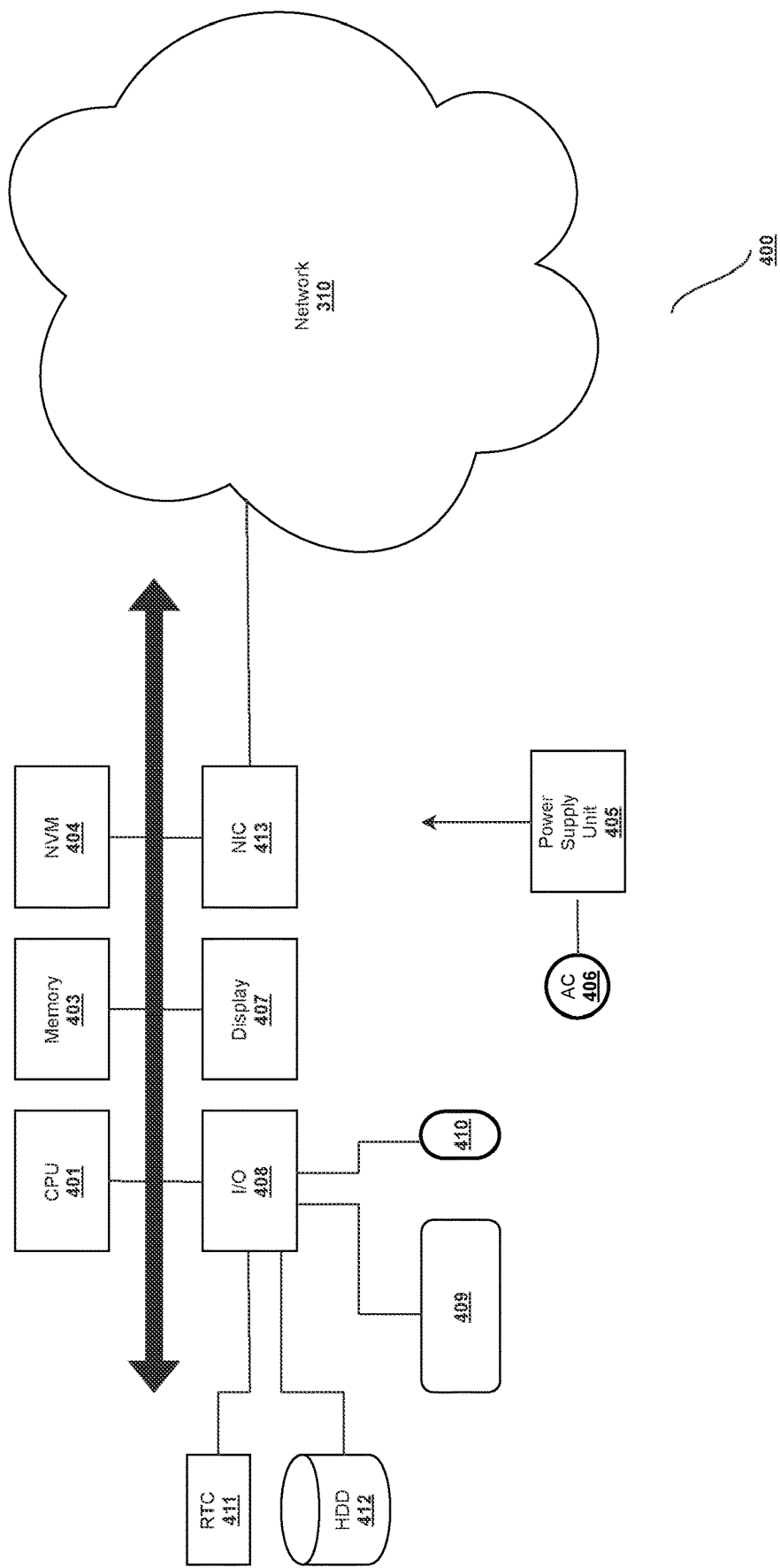
FIG. 4A is another block diagram illustrating an exemplary hardware architecture of a computing device used in various embodiments of the invention.

FIG. 4A shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4B:
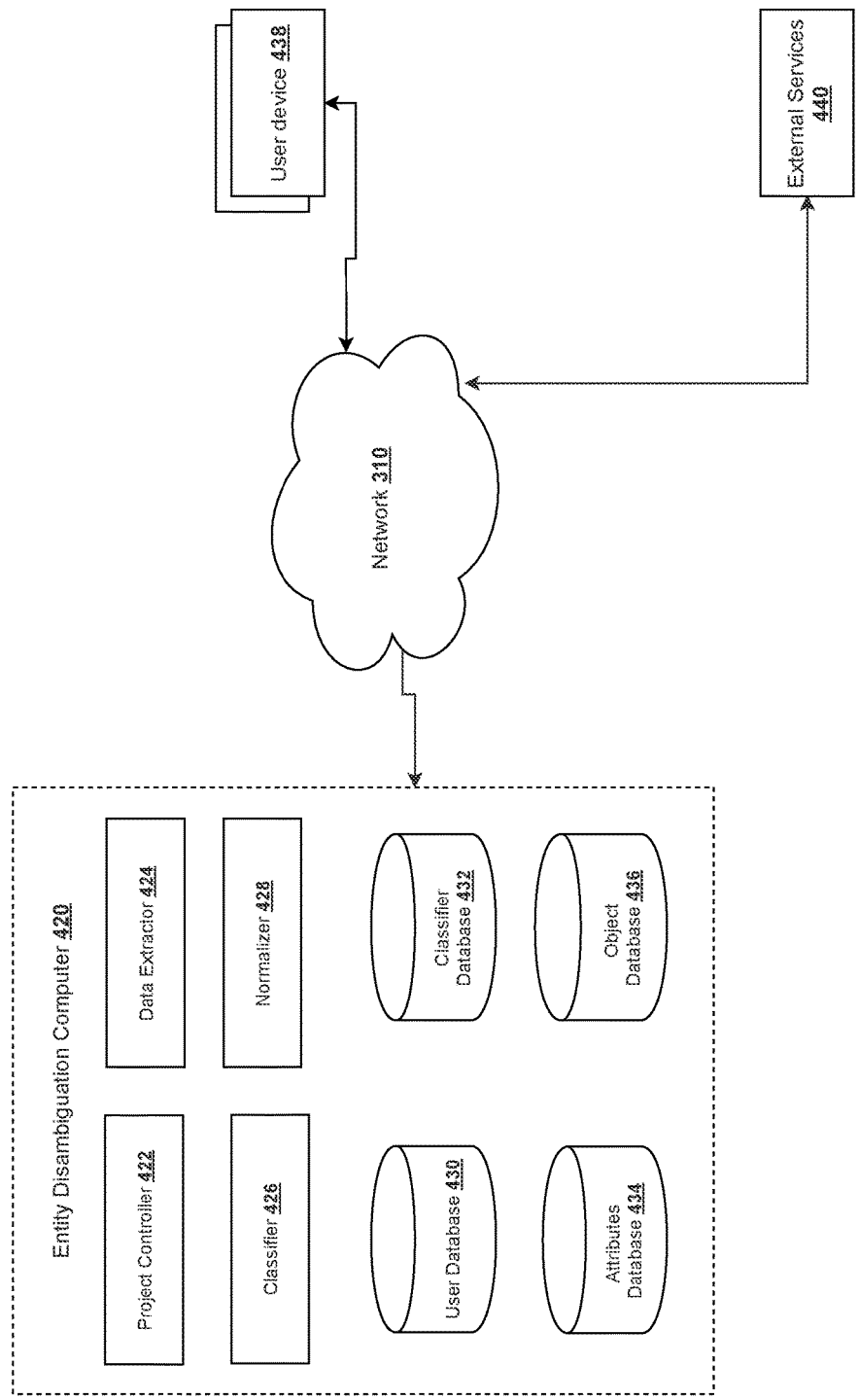
FIG. 4B illustrates a block diagram of an entity disambiguation computer, according to a preferred embodiment of the invention.

FIG. 4B illustrates a block diagram of an entity disambiguation computer, according to a preferred embodiment of the invention. According to the embodiment, entity disambiguation computer 420 comprises a processor 210, memory 240 and a plurality of programming instructions, the plurality of programming instructions stored in memory 240 that when executed by processor 210 cause the processor to disambiguate a plurality of customer relationship management records. The entity disambiguation computer 420 further comprises: project controller 422, data extractor 424, classifier 426, and normalizer 428. The entity disambiguation computer 420 further comprises user database 430, classifier database 432, attributes database 434, and object database 436.

Figure 5:
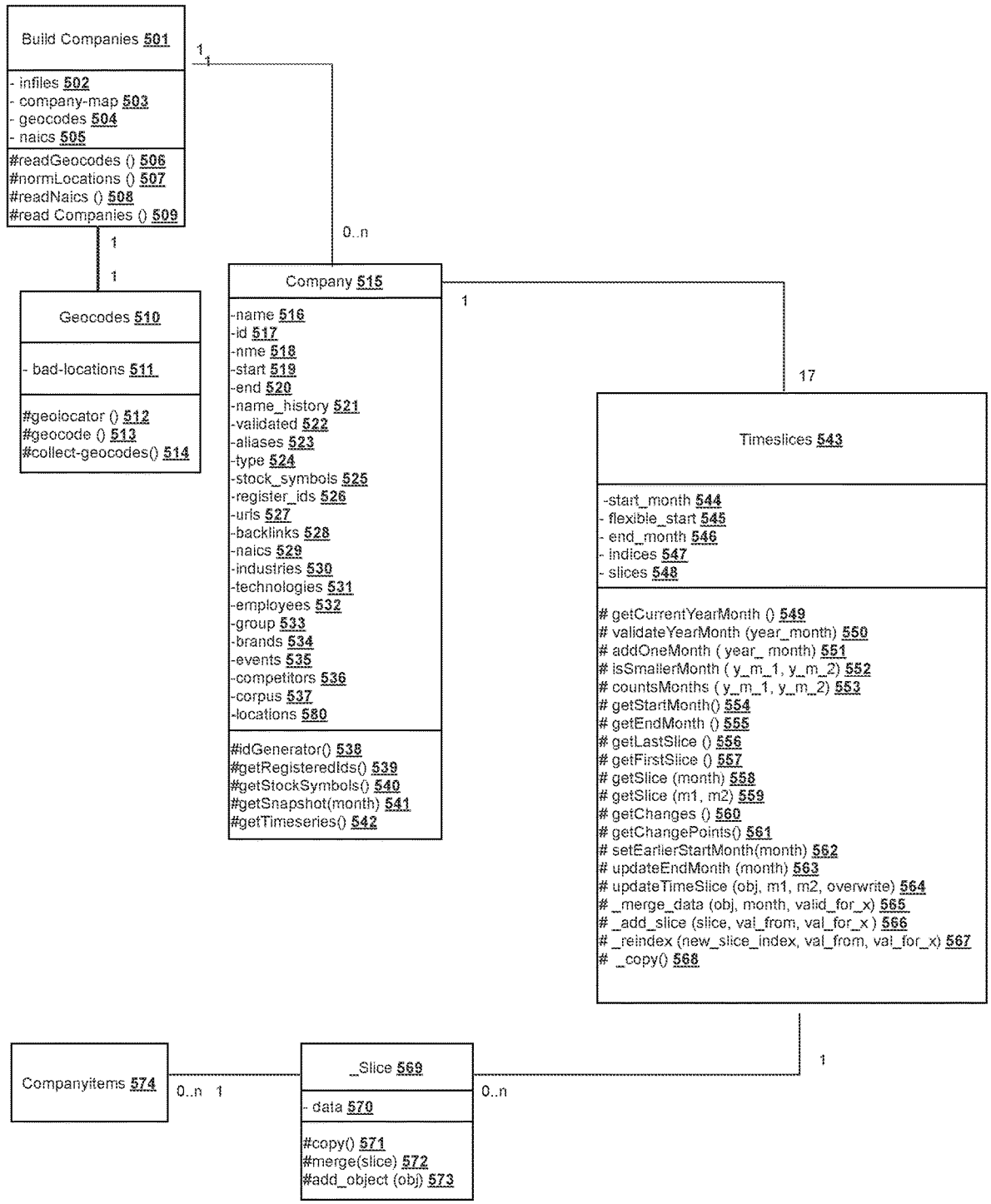
FIG. 5 illustrates a block diagram comprising of a plurality of objects having data attributes and classes, in accordance with an embodiment of the invention.

FIG. 5 is system diagram illustrating the system components and objects comprising, in accordance with a preferred embodiment of the invention. According to the embodiment, project controller 422 may apply a plurality of objects to manage feature extraction and classification processes for the data. As shown in the fig, the objects may comprise build companies 501, geocodes 510, company 515, timeslices 543, slices 569, and companyitems 574. Each of these objects may include data attributes and one or more functions to obtain data from the data attributes for initializing classification processes.

In an embodiment, class build companies 501 may contain data attributes including infiles 502, company-map 503, geocodes 504, and naics 505. Further, the functions used to extract relevant data from the data attributes may include readgeocodes( ) 506, normlocations( ) 507, readnaics( ) 508, and readcompanies( ) 509.

In the embodiment, the data attributes may store data pertaining to company information, as retrieved from one or more internal and/or external data sources. In an example, the one or more data sources may include resume data, organization website, company reporting documents, internal and external databases, and the like. For example, infiles 502 may contain data of a company or organization obtained from internal files and reports associated with the company or organization. Further, company map 503 may contain data retrieved from organization charts, government filings, and stock information. Data attribute geocodes 504 may similarly contain information pertaining to company locations, like global offices, countries, and cities of operation, headquarter location, etc. For companies specifically operating in North America, NAICS 505 may contain information regarding North America Industry Classification Codes System (NAICS) for one or more companies' being classified. Although the NAICS 505 may be representative of codes associated with for North American entities, in one embodiment, NAICS 505 may also contain codes assigned to companies independently from their location.

Further, class build companies 501 may also include functions that may be operated by data extractor 424 to read and extract data from data attributes as described above. For instance, readgeocodes( ) 506 function may be used by data extractor 424 to extract and read geocodes contained in geocodes 504. Similarly, normlocations( ) 507 function may be used by normalizer 428 to generate normalized locations from the extracted geocodes, for example, by eliminating duplicate location data and standardizing location names. Further, the NAICS codes may be obtained by data extractor 424 by operating readnaics( ) 508 function. Furthermore, readcompanies( ) 509 function may be initialized by data extractor 424 to extract relevant company information as stored in company-map 503 data attribute.

In a preferred embodiment, class geocodes 510 may be used by data extractor 424 to obtain geocodes for one or more given company locations asynchronously and deliver latitude and longitude information for requested locations. In the embodiment, class geocodes 510 may include one or more data attributes including, but not limited to, bad-locations 511. Further, to extract relevant data from the data attributes class geocodes 510 may also include one or more functions such as geolocator( ) 512, geocode( ) 513, and collect-geocodes( ) 514.

For example, in the embodiment, data attribute bad-locations 511 may contain information associated with one or more locations for which geocodes 510 could not be found. This ensures that project controller 422 may not try to repeatedly find geocodes 510 for location field values, that could previously not be linked to a real location. Geolocator( ) 512 may return the geo coordinates latitude and longitude for a given location.

In another embodiment, class company 515 may contain one or more data attributes having stored bibliographic information for a given company. In the embodiment, class company 515 may include data attributes such as name 516, id 517, nme 518, start 519, end 520, name_history 521, validated 522, aliases 523, type 524, stock_symbols 525, register_ids 526, urls 527, backlinks 528, naics 529, industries 530, technologies 531, employees 532, group 533, brands 534, events 535, competitors 536, and corpus 537.

The data attributes may contain information about a given company and may be used for extracting relevant information for classification stored therein. For example, data attribute name 516 and ID 517 may have stored data associated with the company's official name on record, name changes, etc. and an official identification for the company (e.g., Employer Identification Number), respectively. Further, data attributes start 519 and end 520 may contain date of incorporation of an organization and a date when the organization ceased to exist (if applicable), respectively. Other data attributes such as aliases 523 may contain information pertaining to different names of an organization, including but not limited to spelling variations, abbreviations, and other names associated with the organization. Similarly, data attributes industries 530 and technologies 531 may store data pertaining to industry sectors and technology domains the organization generally operates in.

In an embodiment, to extract data stored in the aforementioned data attributes data extractor 424 may run one or more functions, including but not limited to idgenerator( ) 538, getregisteredIds( ) 539, getstocksymbols( ) 540, getsnapshot (month) 541, and gettimeseries( ) 542. For instance, data extractor 424 may run function getstocksymbol( ) 540 to extract a stock market ticker for a given publicly listed organization. In another example, data extractor 424 may run function getregisteredIDs( ) 539 to extract registered identifications of an organization such as EIN, TIN, state IDs, etc.

In an embodiment, class timeslices 543 may be used by classifier 426 to classify information pertaining a given company attribute over time. In the embodiment, timeslices 543 may be optimized on fast data retrieval and may minimize storage overhead. In several embodiments, different attributes of companies may change at different rates and different points in time. For example, a first company that was previously headquartered in San Francisco, may later move their operations to Austin, while the first company's name and stock symbol may remain unchanged. In the example, only data attribute locations 580 may receive a new state that is, in one embodiment, a new slice of data. Further, this may enable project controller 422 to determine a change in the headquarter location for the first company, thereby ensuring that all extracted data for classification processes is current and highly relevant while historic data can still be retrieved, in a preferred embodiment, in a computationally inexpensive way. Each company attribute that may change over time, such as names, locations, stock symbols, etc. is organized in a distinct timeslices 543 for each company.

Data attributes stored within timeslices 543 may include start_month 544, flexible_start 545, end_month 546, indices 547, and slices 548. Each timeslices 543 may contain a data attribute start_month 544 that may define the start time of the timeslices 543. In an embodiment, the start time may be representative of a start or founding date of a given company. The end_month 546 may contain data associated with an end time of a timeslices 543, e.g., in the case where newest slice of the timeslices 543 may only be valid to such an end_month 546 and may not currently be valid anymore. That is, in an embodiment, end_month 546 may be populated if a given company is not active anymore and/or if a current value for the corresponding attribute is unknown. In another embodiment, flexible_start 545 may be set to "True", if the oldest slice of timeslices 543 is assumed to be valid, if start_month 544 is updated to a time earlier than a current time. In an embodiment, for a given company having San Francisco marked as an earliest known office location, established in, e.g., May 2000, ingestion of additional data extracted for the company by data extractor 424 may further illustrate a corrected establishment date of the earliest known office, e.g., in December 1999. In such an embodiment, if flexible_start 545 for the locations 580 for the given company is determined to be set to "True", and the locations 580 for the given company from December 1999 to April 2000 be marked as San Francisco. However, if flexible_start 545 is determined to be set to "False", an empty slice may be added for the given time period, e.g., indicating that no location is known for the given company from December 1999 to April 2000. Further, data attributes within slices 548 may have stored an array of slices 548, in a chronological order. Each slice 548 within slices 548 may contain data, such as locations that may be valid for a given company and one or more other attributes at a distinct time period. For each slice 548 in slices 548 a corresponding integer may exist in the indices 547. In an embodiment, each corresponding integer may define a number of months for which the corresponding slice 548 may be valid. For instance, using at least start_month 544 and information stored in indices 547, a real-time state of a given attribute, at any given point in time may be swiftly retrieved from timeslices 543 by further processing by data extractor 424.

In an embodiment, data extractor 424 may run a first plurality of functions associated with class timeslices 543, for extracting relevant data as stored within the data attributes described above. In the embodiment, the functions for obtaining data from data attributes 544 and 546 may include getstartmonth( ) 554, and getendmonth( ) 555. Further, one or more functions to assist with calculation of months and years may include getcurrentyearmonth( ) 549, validateyearmonth (year_month) 550, addonemonth (year_month) 551, issmallermonth (y_m_1, y_m_2) 552, countsmonths (y_m_1, y_m_2) 553, and the like. For example, function getcurrentyearmonth( ) 549 may return information about the current year and month to assign it to new information obtained about a given company today. Alternatively, validateyearmonth (year_month) 550 may verify if the year and month obtained from an external dataset is valid, for example that the given month and year do not overshoot a current year and month. Furthermore, running function issmallermonth (y_m_1, y_m_2) 552 may verify whether a first value of year and month is smaller than a given year and month, for example, if the current start year and month of timeslices 543 is smaller than a given year and month in a new dataset. Also, countsmonths (y_m_1, y_m_2) 553 may return the number of months between the current start year and month of timelices 543 and the year and month of a new datapoint that has to be inserted into the timeslices 543.

In another embodiment, data extractor 424 may run a second plurality of functions associated with class timeslices 543, for extracting relevant data as stored within the data attribute slice 548. In the embodiment, the functions for obtaining data from data attribute slice 548 may include getlastslice( ) 556, getfirstslice( ) 557, getslice (month) 558, getslice (m1, m2) 559, getchanges( ) 560, and getchangepoints( ) 561. For example, getlastslice( ) 556 may return the last available slice 548, that is the newest information that is available for a given corresponding company and company attributes. Similarly, getfirstslice( ) 557 may return the slice 548 with the earliest information available. Further, getslice (month) 558 may return the slice 548 with information valid on a given year and month; and getslice (m1, m2) 559 may return all slices 548 that have been valid within a given time range. Finally, getchanges( ) 560, and getchangepoints( ) 561 may return a timeseries of data changes and the year-month combinations in which those changes have happened, respectively.

Further, other functions associated with class timeslices 543 may include setearlierstartmonth (month) 562, updateendmonth (month) 563, updatetimeslice (obj, m1, m2, overwrite) 564, _merge_data (obj, month, valid_for_x) 565, _add_slice (slice, val_from, val_for_x) 566, _reindex (new_slice_index, val_from, val_for_x) 567, and _copy( ) 568. Those functions may be used by classifier 426 to change timeslices 543. For example, if a new data source discloses that a given company has existed already before the year and month currently set as start_month 544, setearlierstartmonth (month) 562 may update start_month 544 to that earlier year and month. Similarly, if flexible_start 545 is set to "true", setearlierstartmonth (month) 562 may add the number of months difference between the new and old start year and month to the first item of the indices 547 at index 0, indicating that the earliest slice 548 is now valid for a larger number of months. If flexible_start 545 is set to "false", setearlierstartmonth (month) 562 may add the number of months difference between the new and old start year and month as a new first item of the indices 547 at index 0, and add a new empty slice 548 to the slices 548, indicating that no information is known about the given company and attribute for the time difference between the old and new start year and month. Finally, updateendmonth (month) 563 may be used by project controller 422 to set end_month 546 to a given year and month. Further, updaatemmonth (month) 563 may be used by project controller 422 to update the last item in the indices 547 at index −1 to the difference between the time in months between the start_month 544 and end_month 546 minus the sum of all previous items in the indices 547 at indices 0 to −2. Each item in indices 547 may represent a number of months that the corresponding slice 548 at the same index in slices 548 is valid for. Thus, the sum of numbers in indices 547 may be equal to the number of months between the start_month 544 and end_month 546.

Figure 10:
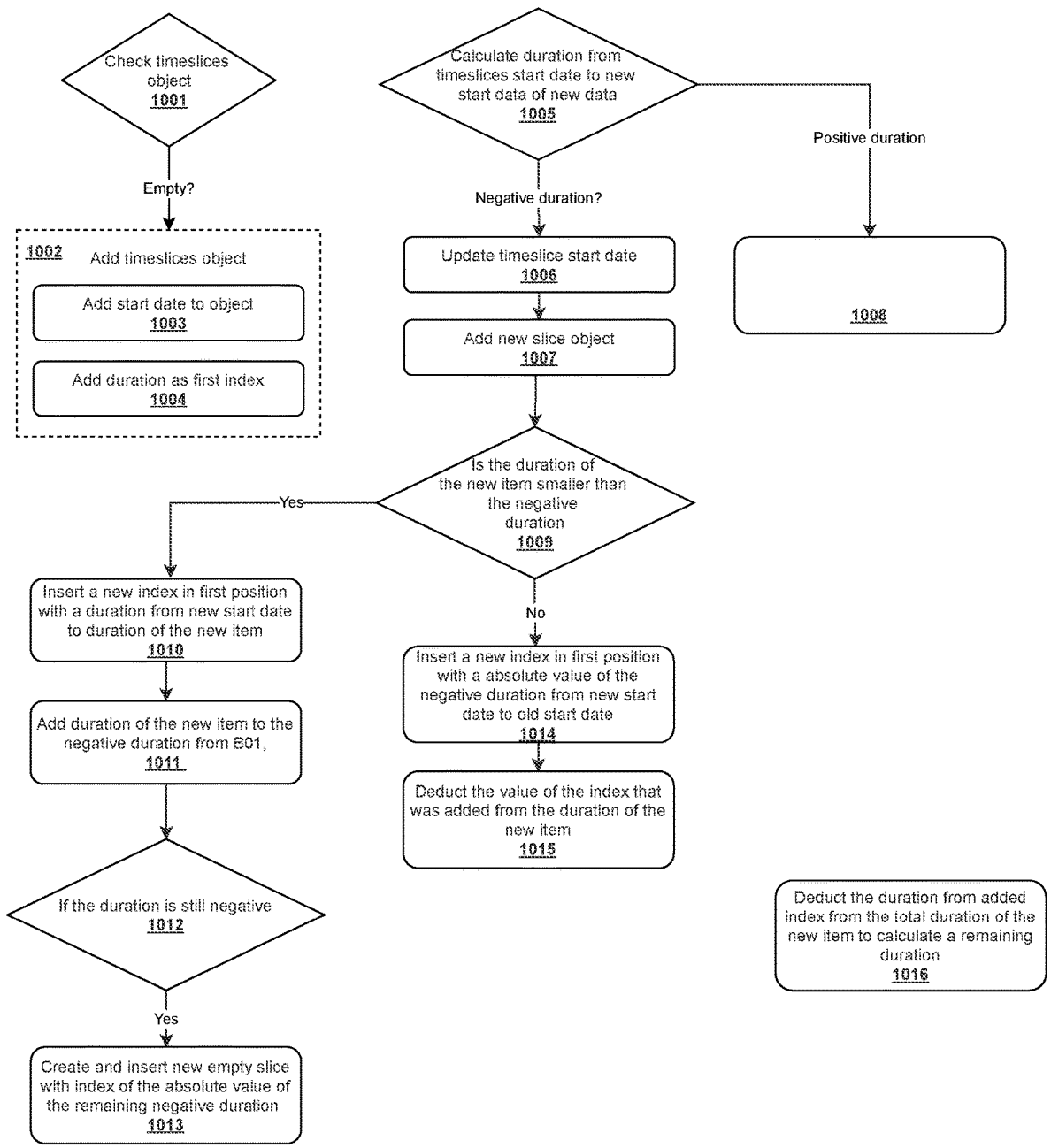
FIG. 10 illustrates a flow diagram for a method for updating a plurality of time slice objects, in accordance with a preferred embodiment of the invention.
Figure 11:
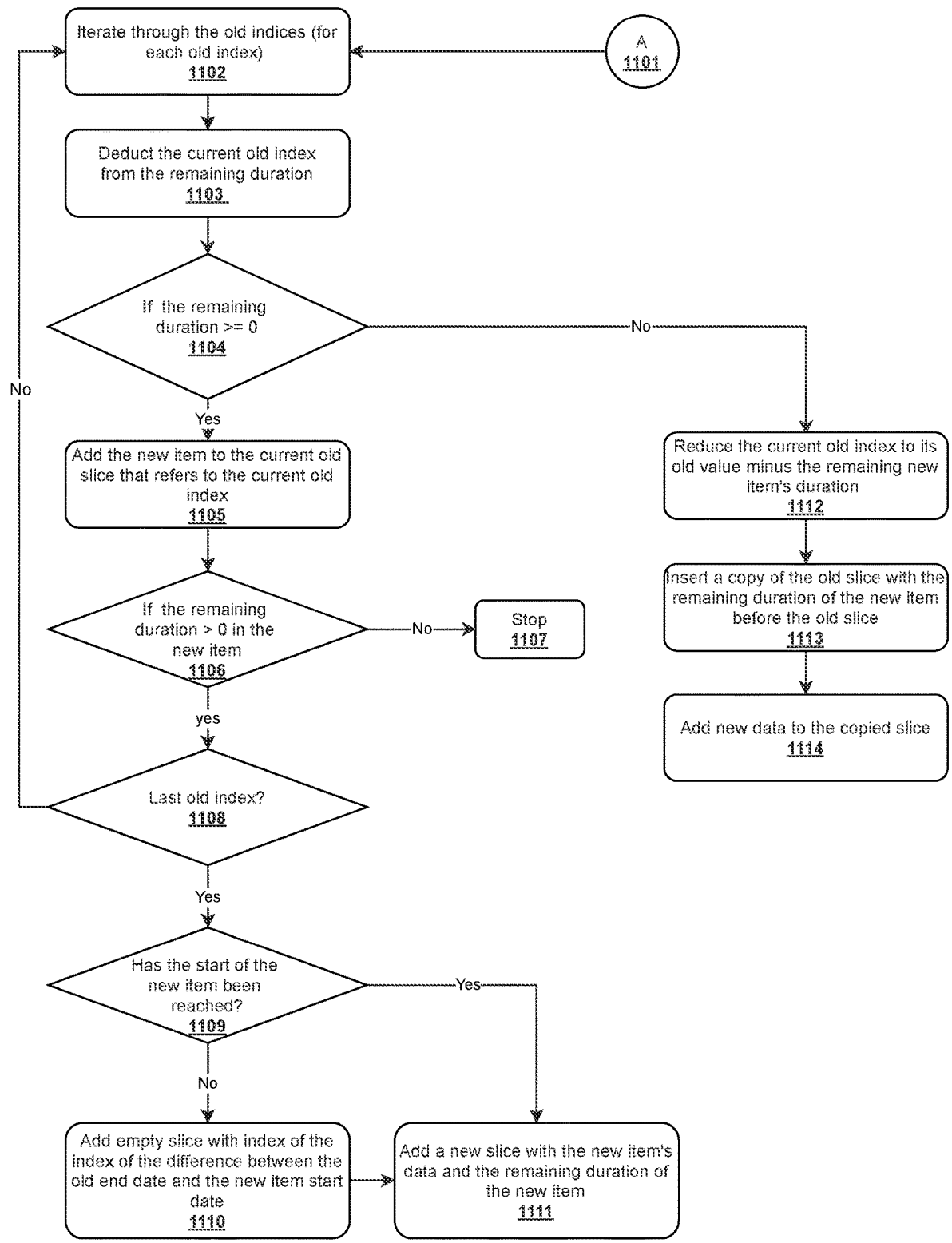
FIG. 11 illustrates a flow diagram for a method for managing one or more overlapping time slice objects, in accordance with a preferred embodiment of the invention.
Figure 12:
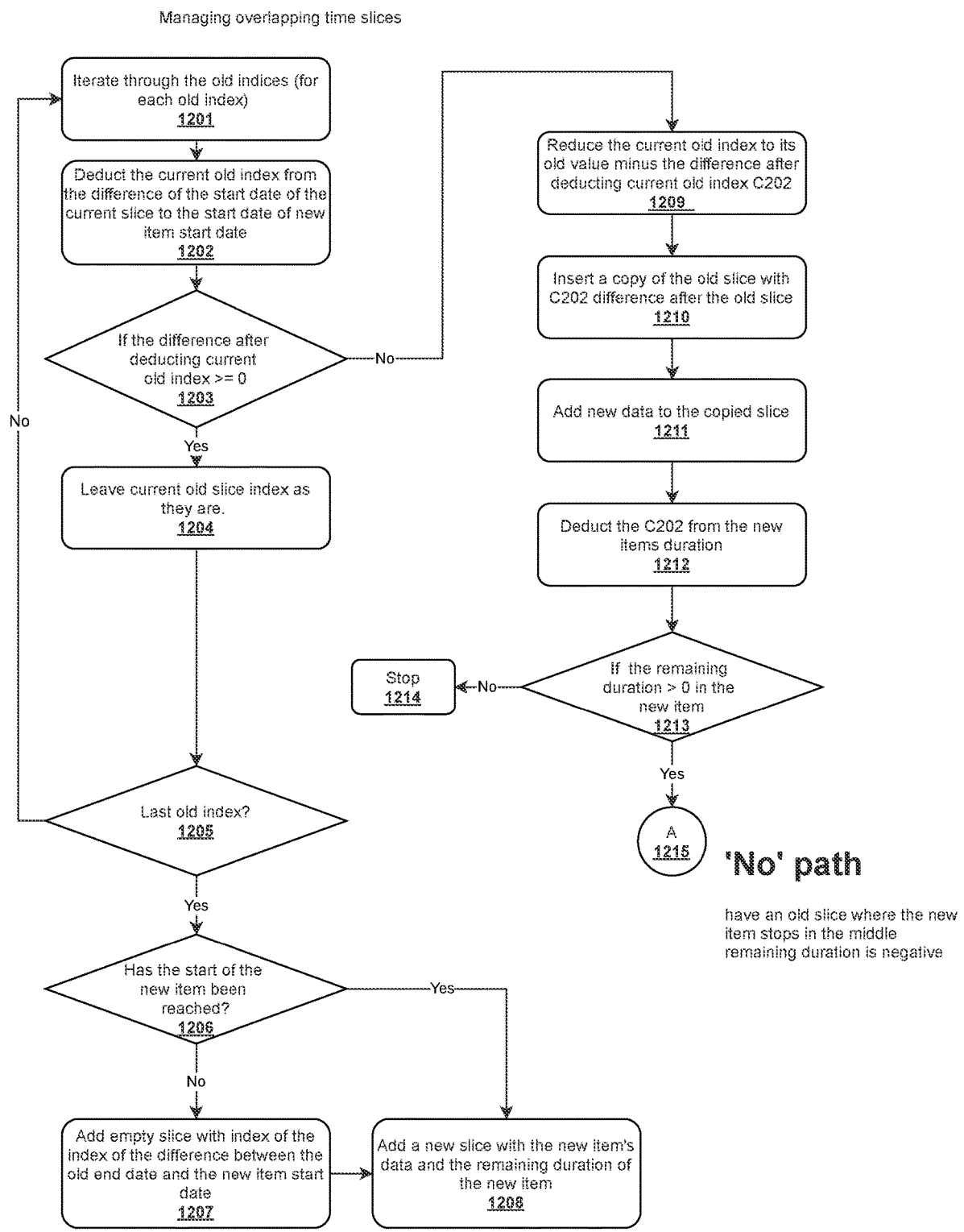
FIG. 12 illustrates a flow diagram for a method for managing overlapping time slices, according to a preferred embodiment of the invention.

In an embodiment, updatetimeslice (obj, m1, m2, overwrite) 564 may add additional data to a timeslices 543. In the above object, "obj" may refer to new data, for example a new location, name, or stock symbol. Further, "m1" may refer to the start year and month of initiation of said new data; and "m2" may refer to an end date of a given data object, if applicable. In one embodiment, if m2 is not available, is the value of m2 may be assumed to be valid on an ongoing basis. In the embodiment, "overwrite" may refer to a status of overwrite permissions and may be set to true or false by project controller 422. If overwrite is set to "true", all existing data for a given period, company, and data attribute may be overwritten with new data. However, if overwrite is set to "false", new data objects may be added without overwriting existing data objects. In another embodiment, updatetimeslice (obj, m1, m2, overwrite) 564 may modify the timeslices 543 as shown in FIGS. 10-12, as described in steps 1001-1213.

Within the timeslices 543 update process, one or more internal functions may be used, including but not limited to, merge_data (obj, month, valid_for_x) 565 may be used to merge new data objects into existing slices 548 within the slices 548 that may be valid as well within the given time period that the new data object is valid for; _add_slice (slice, val_from, val_for_x) 566 may add a new slice object of class Slice 569 to the given timeslices 543, that is, to insert the slice on the correct index within slices 548 and to initiate an update of indices 547 by calling the function_reindex (new_slice_index, val_from, val_for_x) 567, which iterates through existing indices 548 and inserts a new integer representing number of months that the new slice is valid for and decreases the neighboring integers, if the new slice partially overlaps with previously stored data; and _copy( ) 568 may generate a copy of a timeslices 543. In one embodiment, a copy of timeslices 543 may be required to update a current version of timeslices 543 in multiple steps, such as the steps_add_slice (slice, val_from, val_for_x) 566 and _reindex (new_slice_index, val_from, val_for_x) 567, while restoring information about its previous state until the full update is competed.

In an embodiment, another class _slice 569 may be used by timeslices 543 to store and retrieve data in timeslices 543. In the embodiment, timeslices 543 may be used by data extractor 424 to extract data to process class _slice 569 using data 570, and functions copy( ) 571, merge(slice) 572, and add_object (obj) 573. Further, child classes of class companyitems 574 may be used by data extractor 424 to store the actual company information within the data 570 of a _slice 569. In an embodiment, copy( ) 571 may return an exact copy of a given _slice 569 including copies of the companyitems 574 within its data attribute. Further, merge(slice) 572 may merge data attributes of two given _slice 569 and add_object (obj) 573 may add a new companyitems 574 into the data attribute of a given _slice 569.

In a preferred embodiment, each object of company 515 may be linked to upto seventeen different objects within TimeSlices 543, however, each object within TimeSlices 543 may only associate with one specific object within company 515. That is, any given object within timeslices 543 may be assigned to each attribute within company 515, e.g., attributes 521-537, i.e., attributes of company 515 that may change over time, such as company name history, validated, aliases, type, etc.

Figure 6:
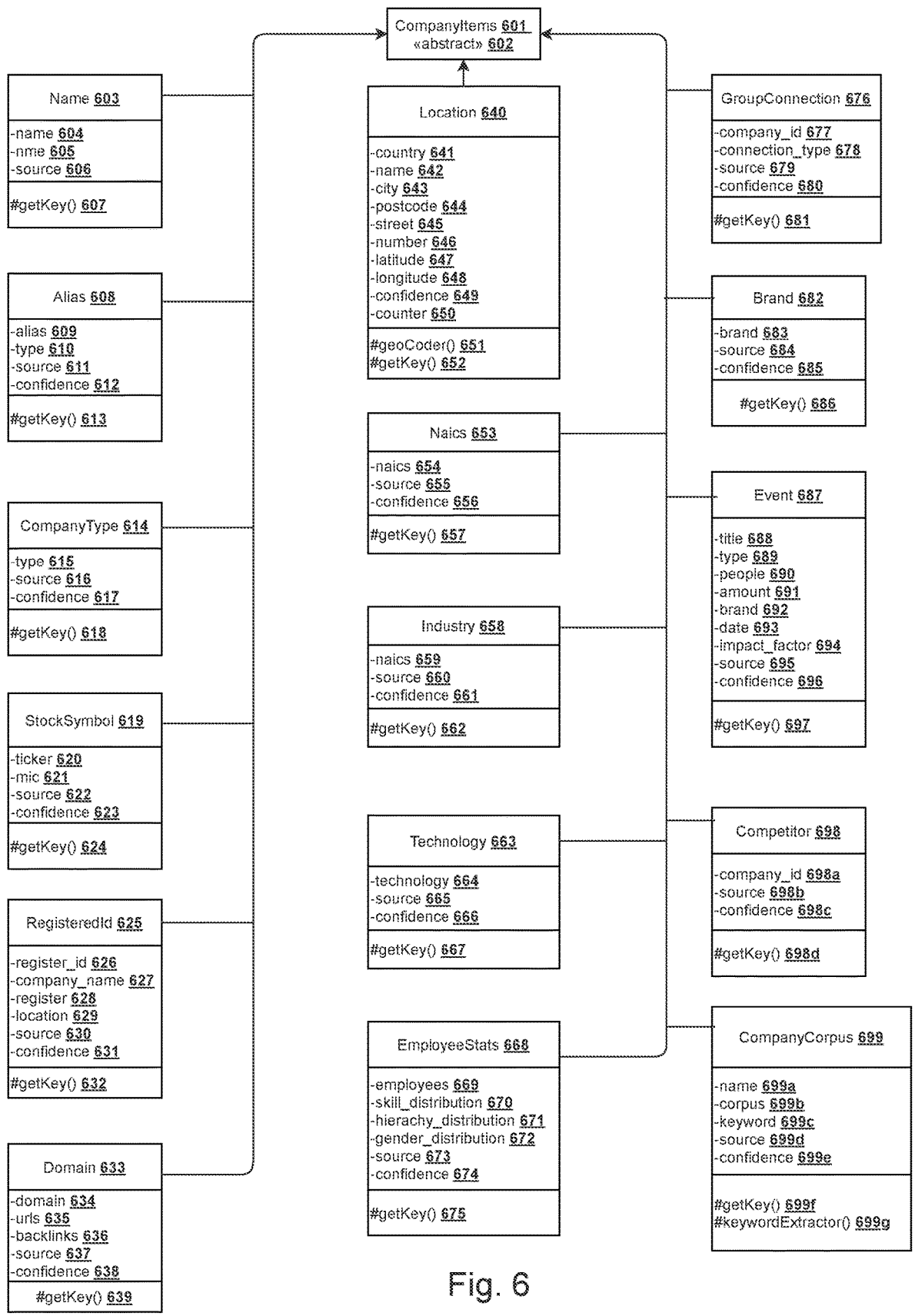
FIG. 6 illustrates another block diagram depicting a plurality of subclasses, in accordance with a preferred embodiment of the invention.

FIG. 6 is another system diagram depicting a plurality of subclasses, in accordance with a preferred embodiment of the invention. In the embodiment, each subclass may be associated with one or more data attributes and a corresponding getKey( ) function, such that each getkey( ) may return a key as a single string that represents data stored in a respective object. For instance, in an embodiment, when companyitems 601 is stored in the data attribute of a slice 548, companyitems 601 may be keyed by project controller 422 using the string returned by a corresponding get_key( ). That is, for each companyitems 601 sub-class, the string returned by its corresponding get_key( ) may correspond to concatenated attribute values of that class, except for confidence 649.

In an embodiment, each subclass of the plurality of subclasses may be bundled in an abstract class, labeled as companyItems 601. The plurality of subclasses may firstly include name 603 including data attributes name 604, nme 605, and source 606. Subclass name 603 may further comprise a getKey( ) function 607 linked with the object such that data extractor 424 may extract a key associated with the object from a key value class. In an embodiment, name 603 may be used by data extractor 424 to extract names of companies and/or organizations for further classification. For example, a registered name of a given company may be extracted by data extractor 424 from data attribute name 604. Further, data attribute nme 605 may be used by data extractor 424 to extract information regarding the normalized name of the company. Furthermore, data extractor 424 may extract a data source information from source 606. In some embodiments, the data source may be external data sources such as resume data, company websites, government filings, social media, etc., or internal data sources such as company records, internal reports, annual reports, and the like.

In an embodiment, the plurality of subclasses may further comprise alias 608. In the embodiment, alias 608 may be used by data extractor 424 to extract information pertaining to various name variations for a given company or organization at various different periods of time. Further, alias 608 may comprise of data attributes alias 609, type 610, source 611, and confidence 612. In an example, data extractor 424 may extract different name variations for the given company, including but not limited to abbreviations, past names, short form names, and the like, using alias 609. Further, data extractor 424 may obtain the type 610 of the alias, for example, if the given alias is an abbreviation. Furthermore, data extractor 424 may identify a source of the extracted information stored within alias 609 and type 610, using data available in source 611. The source of extracted information may be an external source or an internal source. Further, a string returned by getkey( ) 613 may correspond to concatenated attribute values that may be used by project controller 422 to key data stored within alias 608.

In an embodiment, a confidence score may be generated by project controller 422 using data stored in confidence 612, in order to authenticate data extracted from various data attributes under subclass name 603. The confidence score may then be used by classifier 426 to determine datasets to be filtered during further classification processes.

Referring back to FIG. 6, the plurality of subclasses may further comprise companytype 614. In an embodiment, project controller 422 may use information from companytype 614 to determine what category a particular company or organization falls into. The categories may include, but not limit to, sole proprietorship, partnership, corporation, and Limited Liability Company (LLC). In the embodiment, data extractor 424 may determine the category of the given company using data extracted from data attribute type 615. Further, ZZZ may also identify a source of information about the category from data stored within data attribute source 616. As described in the foregoing, project controller 422 may again generate a confidence score for the extracted data based on values retrieved from data attribute confidence 617. Further, a string returned by getkey( ) 618 may correspond to concatenated attribute values that may be used by project controller 422 to key data stored within companytype 614.

In an embodiment, the plurality of subclasses may further comprise stocksymbol 619. In the embodiment, project controller 422 may identify stock market information associated with a given company or organization based on data extracted from data attributes associated with stocksymbol 619 including ticker 620, mic 621, source 622, and confidence 623. In an example, stock market information may include ticker symbol information and other IPO based information, as retrieved by project controller 422 from ticker 620. Further, data extractor 424 may extract information pertaining to the stock exchange on which the ticker symbol is listed from mic 621. Furthermore, details about a source from which stock information is retrieved, may be determined by data extractor 424 from data attribute source 622. Finally, project controller 422 may also generate a confidence score for the extracted data for subclass stocksymbol 619 based on values retrieved from data attribute confidence 623. Further, a string returned by getkey( ) 624 may correspond to concatenated attribute values that may be used by project controller 422 to key data stored within stocksymbol 619.

In another embodiment, the plurality of subclasses further comprises registeredId 625. In the embodiment, data extractor 424 may obtain information pertaining to registered identification for a given company or organization based on one or more data attributes including register_id 626, company_name 627, register 628, location 629, source 630, and confidence 631. For example, data extractor 424 may extract data about registered IDs for the company or organization using data stored in register_id 626. Further, ZZZ may determine, for each registered ID, the name of the company using company_name 627 and the register where the company ID is recorded using register 628. Furthermore, for each registered ID for the company, data extractor 424 may also identify an associated location value from location 629. The source from which the above data is accumulated may be identified by data extractor 424 using information stored in source 630. Finally, project controller 422 may generate a confidence score for the data extracted from data attributes 626-630, based on information stored within confidence 631. Further, a string returned by getkey( ) 632 may correspond to concatenated attribute values that may be used by project controller 422 to key data stored within registerID 625.

In another preferred embodiment, the plurality of subclasses further comprises domain 633. In the embodiment, data extractor 424 may use the subclass domain 633 to identify and retrieve relevant information associated with domain names for a given company or organization. For example, the information may comprise active domain names, dormant domain names, alternative domain names, and the like for the given company. Further, data extractor 424 may identify domain name information based on data extracted from data attributes associated with domain 633. The data attributes may include domain 634, urls 635, backlinks 636, source 637, and confidence 638. For example, ZZZ may identify the registered domain names using data stored within domain 634. Further, ZZZ may extract information about the Uniform Resource Links (URLs) for each of the registered domain names using data from urls 635. Furthermore, data extractor 424 may extract information regarding from data stored within backlinks 636. As described in the foregoing, project controller 422 may again determine one or more sources of the relevant information, from data stored within source 637. Further, for each source identified, project controller 422 may calculate a confidence score, indicative of authenticity of the source, using data extracted from confidence 638. Further, a string returned by getkey( ) 639 may correspond to concatenated attribute values that may be used by project controller 422 to key data stored within domain 633.

In one embodiment, the plurality of subclasses further comprises location 640. In the embodiment, data extractor 424 may extract data relevant to different locations associated with a given company or organization from location 640. For example, data extractor 424 may identify data for headquarter location, location of incorporation, warehouse locations, countries, cities, postcodes, and the like, using data attributes associated with location 640. As depicted, the data attributes may include country 641, name 642, city 643, postcode 644, street 645, number 646, latitude 647, longitude 648, and confidence 649. In an example, ZZZ may identify the name of location, country, city, postcode, street number using data from country 641, name 642, city 643, postcode 644, street 645, number 646, respectively. Further geocode information having values for latitude and longitude may be identified by data extractor 424 using data stored within latitude 647 and longitude 648, respectively. Further, counter 650 may store a count of how often the given location has been used in the data corresponding to the given company, for example in employment records. This may help to distinguish small office locations with only few employees from the main locations where the majority of employees may be located. In an embodiment, geocoder( ) 651 may call the geolocator( ) 512 to retrieve the latitude 647 and longitude 648 of the given location. Further, a string returned by getkey( ) 652 may correspond to concatenated attribute values that may be used by project controller 422 to key data stored within location 640.

In one embodiment, the plurality of subclasses further comprises naics 653. In the embodiment, data extractor 424 may extract data relevant to NAICS codes associated with a given company or organization from data attributes associate with naics 653. The data attributes may include naics 654, source 655, and confidence 656. In an example, data extractor 424 may extract information pertaining to different NAICS codes based on data stored within naics 654. Further, project controller 422 may identify one or more sources from which said information is sourced, based on data extracted from source 655. For each such identified source, project controller 422 may calculate a confidence score based on relevant data stored within confidence 656. Further, a string returned by getkey( ) 657 may correspond to concatenated attribute values that may be used by project controller 422 to key data stored within naics 653.

In another embodiment, the plurality of subclasses further comprises industry 658. In the embodiment, ZZZ may use industry 658 to determine relevant industry sectors a given company operates in, such as but not limited to, legal, manufacturing, logistics, e-commerce, software, and the like. In an example, ZZZ may identify said industry sectors based on data stored in data attributes naics 659, source 660, and confidence 661. For instance, ZZZ may identify type of industry based on NAICS codes as retrieved from naics 659. Further, ZZZ may determine one or more sources from which said NAICS codes are obtained, using information stored in source 660. Furthermore, ZZZ may link a confidence score for each source, based on data extracted from confidence 661. Further, a string returned by getkey( ) 662 may correspond to concatenated attribute values that may be used by ZZZ to key data stored within industry 658.

In a preferred embodiment, the plurality of subclasses may further comprise technology 663. In the embodiment, ZZZ may use data from technology 663 to determine one or more technology domains a company operates in. For example, the technology domains may include Internet of Things (IoT), medical devices, wearables, intelligent transportation system, robotics, IT, and the like. The technology domains may be identified by ZZZ based on data stored within one or more data attributes comprising technology 664, source 665, and confidence 666. For instance, ZZZ may identify type of technology domain based on data as retrieved from technology 664. Further, ZZZ may determine one or more sources from which said data is obtained, using information stored in source 660. Furthermore, ZZZ may link a confidence score to each source, based on data extracted from confidence 666. Further, a string returned by getkey( ) 667 may correspond to concatenated attribute values that may be used by ZZZ to key data stored within technology 663.

In an embodiment, the plurality of subclasses may further comprise employeestats 668. In the embodiment, ZZZ may identify employee statistics for one or more employees of a given company or organization, using employeestats 668. For instance, the employee statistics may include information regarding number of employees, names of employees, skill sets, organizational structure and hierarchy, gender distribution, and the like. In the embodiment, ZZZ may retrieve above data from data attributes including employees 669, skill_distribution 670, hierarchy_distribution 671, gender_distribution 672, source 673, and confidence 674. For example, ZZZ may determine employee skill sets using data from skill_distribution 670. Further, ZZZ may identify gender ratios within employees based on data stored within gender_distribution 672. Furthermore, ZZZ may rate one or more sources of information, as identified using data from source 673, based on authenticity of a source. The authenticity of the source may be determined by ZZZ based on respective confidence scores, as determined using data from confidence 674. Further, a string returned by getkey( ) 675 may correspond to concatenated attribute values that may be used by ZZZ to key data stored within employeestats 668.

In an embodiment, the plurality of subclasses may further comprise groupconnection 676. In the embodiment, ZZZ may identify related companies based on the data attributes associated with groupconnection 676. The data attributes may comprise company_id 677, connection_type 678, source 679, and confidence 680. The data attribute connection_type 678 may identify information about the type of the given company group connection, for example if the given company is a parent company or subsidiary of the connected company. Furthermore, ZZZ may rate one or more sources of information, as identified using data from source 679, based on authenticity of a source The authenticity of the source may be determined by ZZZ based on respective confidence scores, as determined using data from confidence 680. Further, a string returned by getkey( ) 681 may correspond to concatenated attribute values that may be used by ZZZ to key data stored within groupconnection 676.

In yet another embodiment, the plurality of subclasses may further comprise brand 682. In the embodiment, ZZZ may identify one or more brands associated with a given company or organization. For instance, ZZZ may determine one or more brand names, brand history, marketing statistics, and the like for the one or more brands, using data attributes associated with brand 682. The data attributes may comprise brand 683, source 684, and confidence 685. In an example, ZZZ may extract relevant information about said one or more brands based on information stored within brand 683. Further, one or more sources for such information may be identified by ZZZ, based on data stored within source 684.

For each such identified source, ZZZ may also determine a confidence score, indicative of authenticity of each source, using information extracted from confidence 685. Further, a string returned by getkey( ) 686 may correspond to concatenated attribute values that may be used by ZZZ to key data stored within brand 682.

In another embodiment, the plurality of subclasses may further comprise event 687. In the embodiment, ZZZ may identify one or more events a given company or organization may have participated in or organized in a given span of time. For instance, ZZZ may determine event type, date, attendees, theme, discussion topics, etc. for the one or more events, using data attributes associated with event 687. The data attributes may comprise title 688, type 689, people 690, amount 691, brand 692, date 693, impact_factor 694, source 695, and confidence 696. In an example, ZZZ may extract relevant information about titles of events and type of events based on information stored within title 688 and type 689, respectively. Further, ZZZ may identify details about attendees using data from people 690; targeted brand information using data from brand 692; and dates for each event, based on data stored within date 693. ZZZ may further determine an impact of said events on a given company's business based on data stored within impact_factor 694. Further, one or more sources for such information may be identified by ZZZ, based on data stored within source 695. For each such identified source, ZZZ may also determine a confidence score, indicative of authenticity of each source, using information extracted from confidence 696. Further, a string returned by getkey( ) 697 may correspond to concatenated attribute values that may be used by ZZZ to key data stored within event 687.

In another embodiment, the plurality of subclasses may further comprise competitor 698. In the embodiment, ZZZ may use data associated with competitor 698 to identify one or more competitors of a given company or organization. The one or more competitors may be determined by ZZZ using data attributes associated with competitor 698 including company_id 698a, source 698b, and confidence 698c. For instance, ZZZ may determine competitor company IDs based on data stored within company_id 698a. Further, one or more sources for such information may be identified by ZZZ, based on data stored within source 698b. For each such identified source, ZZZ may also determine a confidence score, indicative of authenticity of each source, using information extracted from confidence 698c. Further, a string returned by getkey( ) 698d may correspond to concatenated attribute values that may be used by ZZZ to key data stored within competitor 698.

In another embodiment, the plurality of subclasses may further include companycorpus 699. A corpus, in one embodiment, may refer to a collection of unstructured text associated with a given company. This text may originate from the company website, news articles, and/or other sources of information associated with the given company. In the embodiment, ZZZ may use data associated with companycorpus 699 in order to compare a semantic embedding of the text corpus of a company profile with the embedding of the text corpus of other company profiles. In a preferred embodiment, such semantic embeddings may be computed by ZZZ using pre-trained language model, e.g., DistilBERT. The use of a language model that is pre-trained on large text-corpora is a common approach in the art. However, a person skilled in the art would appreciate that other forms of semantic representations may also be used instead or in addition. For the comparison of the corpora, the resulting embedding vector of each corpus is compared by ZZZ to other corpus vectors with a common vector similarity metric, such as cosine similarity.

In one embodiment, companycorpus 699 may include data attributes comprising name 699a, corpus 699b, source 699d, and confidence 699e. In the embodiment, name 699a may refer to a name given to distinguish the given corpus from other possible corpora. For example, a website corpus of "someCompany" may be named "websiteCorpusCompanyA". Corpus 699b may contain the actual text of the given corpus. Further, one or more sources for such information may be identified by ZZZ, based on data stored within source 699d. For each such identified source, ZZZ may also determine a confidence score, indicative of authenticity of each source, using information extracted from confidence 699e. Further, a string returned by getkey( ) 699f may correspond to concatenated attribute values that may be used by ZZZ to key data stored within companycorpus 699.

Figure 7:
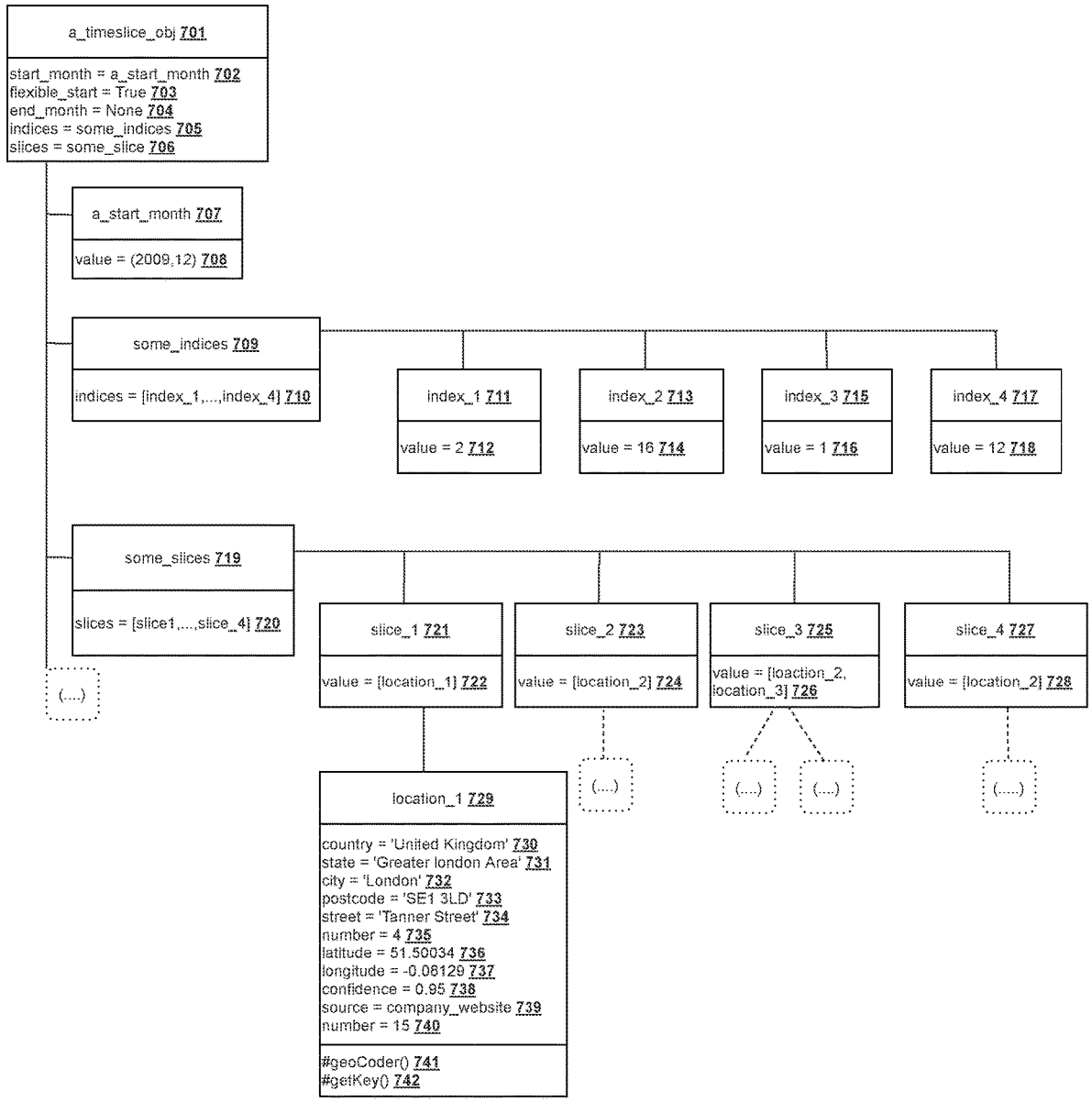
FIG. 7 illustrates another block diagram depicting time-slice objects and associated indices, in accordance with a preferred embodiment of the invention.

FIG. 7 is system diagram illustrating system and object components comprising:

a_timeslice_obj 701 representing, in an embodiment, an exemplary instance of the class TimeSlices 543;

a_start_month 702 referring to a given year and month in a given time period in the past, e.g., as given by value=(2009, 12) 708; and attributes flexible_start 703 may correspond to flexible_start 545, end_month 704 may correspond to end_month 546, indices 705 may correspond to indices 547; and slices 706 may correspond to slices 548, for explanation of the general use of the class instance attributes.

flexible_start=true 703
end_month=none 704
indices=some indices 705
slices=some slice 706
a_start_month 707
value=(2009,12) 708

The system and object components may further comprise some indices 709, indicative of an array of integers representing the number of months that each slice in slices 720 is valid for;

indices=[index_1, . . . , index_4] 710, may represent example values of some indices 709;

index_1 711 and value=2 712, may be example value of first item in indices 711. That is, in an embodiment, if the corresponding slice object, namely slice_1 721 is valid for 2 months, starting from (2009, 12) 708 the index items/values 713/714, 715/716, 717/718 may refer to the number of months that their corresponding slice objects 721-719 are valid for.

slices=[slice1, . . . , slice_4] 720
slice_1 721
value=[location_1] 722
slice_2 723
value=[location_2] 724
slice_3 725
value=[location_2, location_3] 726
slice_4 727
value=[location_2] 728
location_1 729, an example for a possible location object in the embodiment.

country='united kingdom' 730
state='greater london area' 731
city='london' 732
postcode='se1 3ld' 733
street='tanner street' 734
number=4 735
latitude=51.50034 736 longitude=−0.08129 737
confidence=0.95 738
source=company_website 739
number=15 740
geocoder( ) 741
getkey( ) 742

DETAILED DESCRIPTION OF EXEMPLARY EMBODIMENTS

Figure 8:
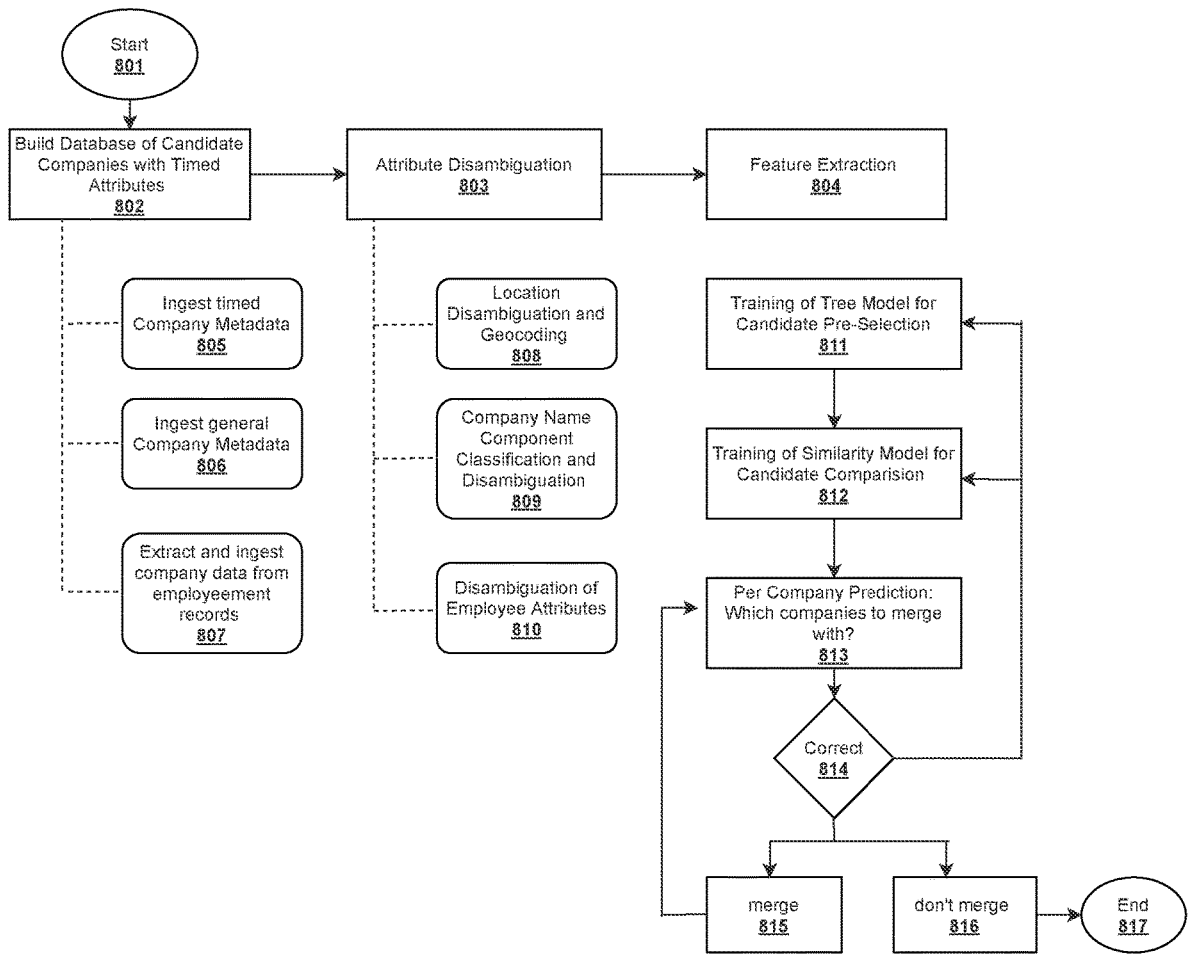
FIG. 8 illustrates a flow diagram for a method for building, linking, and disambiguating a knowledge base, in accordance with a preferred embodiment of the invention.

FIG. 8 is a flow diagram illustrating an exemplary embodiment comprising the steps of:

In a first step 801, ZZZ may start the method 800, In a next step 802, ZZZ may build a database of candidate companies with timed attributes. In an embodiment, ZZZ may build the database of candidate companies based on timed attributes such as names, aliases, locations, competitor information, industry sectors, technology domains, and the like.

In a next step 803, ZZZ may perform disambiguation for the timed attributes based on one or more classification techniques as described in the description that follows. Further, in a next step 804, ZZZ may extract features from the one or more timed attributes. In an embodiment, feature extraction by ZZZ may at least include translation of features of timed attributes into numeric elements within a feature vector per company.

Referring back to step 803, ZZZ may perform disambiguation by at least performing steps 805-807. In step 805, ZZZ may ingest timed company metadata, for example, from a PostgreSQL database version 13.1. In an embodiment, the timed metadata may comprise one or more stock symbols, each linked to a specific company within a given time frame. The timed company metadata may further comprise official company headcount reporting, each reporting linked to a given company on a given point in time, or an average over a given time frame. Further, in a next step 806, ZZZ may ingest general company metadata comprising company website and URL information, registered IDs. Furthermore, in a next step 807, ZZZ may extract and ingest company data from employment records comprising company data as gleaned from company records and including job titles, skill sets, location of employment, educational degrees of employees, and the like.

In a preferred embodiment, ZZZ may build each candidate company as an object and associate said object with data attributes as described in FIG. 5. Further, time sensitive attributes may be stored within TimeSlices Objects, as described in detail with respect to shown in FIG. 6.

Referring back to step 803, ZZZ may perform attribute disambiguation by at least performing steps 808-810. In step 808, ZZZ may initiate location disambiguation and geocoding. In an embodiment, ZZZ may initiate location disambiguation and geocoding using regular expressions to match text patterns and cross-reference identified location components against one or more geocodes databases.

In a next step 809, ZZZ may perform company name component classification and disambiguation. In an embodiment, ZZZ may identify and classify components of company names. For example, for a company named "Rhenus— Forwarding and Logistics Ltd", "Rhenus" may be classified as base name; "–" may be classified as connector; "Forwarding and Logistics" may be classified as function or industry; and "Ltd" may be classified as legal identifier. In a preferred embodiment, ZZZ may utilize a CRF algorithm implemented in the open source library, such as "PYCRFSUITE." In a next step 810, ZZZ may execute disambiguation of employee attributes. In an embodiment, ZZZ may execute disambiguation of employee attributes by mapping skills to skill topics implemented with a Latent Dirichlet Allocation (LDA) topic model algorithm.

Referring back to step 804, ZZZ may execute feature extraction by at least performing steps 811-813. In an embodiment, in step 811, ZZZ may train a tree model for candidate pre-selection. In the embodiment, ZZZ may use manually annotated ("supervised") training examples to train the tree model, so as to facilitate identification of a pre-selection of candidate companies for each company. In an example, the pre-selection of candidate companies may contain a single company. Further, one or more algorithms used to train the tree model may include, but not limit to, Random Forrest algorithm, Gradient Boosting algorithm, and Decision Tree algorithm.

In a next step 812, ZZZ may train a similarity model for candidate comparison. In an embodiment, ZZZ may train a model to predict, if two or more given candidate companies are the same and hence should be merged. In the embodiment, ZZZ may train the model based on said pre-selection of candidate companies as well as one or more training algorithms. The one or more training algorithms may include different Tree Algorithms such as Random Forrest, Regression Algorithms, Neural Networks or Vector Similarity Algorithms like Euclidean Distance model paired with a learned threshold.

In a next step 813, ZZZ may predict for, each candidate company, which companies said candidate company needs to be merged with. In a next step 814, ZZ may determine if said predictions are correct. If said predictions are determined to be correct, in a next step 815, ZZZ may merge said companies. Otherwise, in a next step 816, said companies are not merged. Finally, in a next step 817, the method 800 ends.

Figure 9:
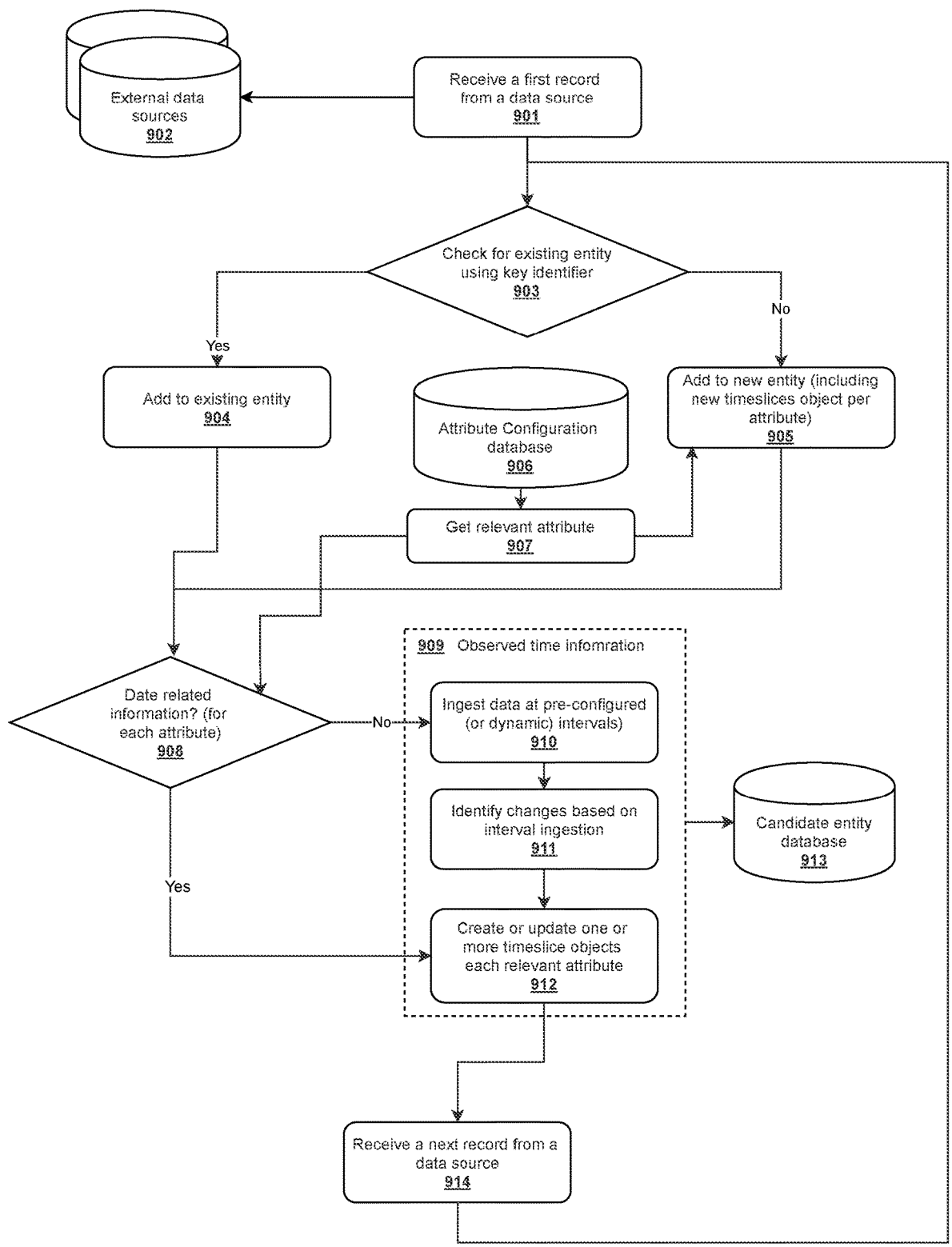
FIG. 9 illustrates a flow diagram for a method for ingestion of records and creation of time slices, according to a preferred embodiment of the invention.

FIG. 9 is a flow diagram illustrating an exemplary embodiment comprising the steps of:

In a first step 901, ZZZ may receive a first record from a data source. In an embodiment, ZZZ may receive the first record from one of a plurality of external data sources (as depicted in step 902). In an embodiment, the external data sources may include resume data, company employee database, social media database, government database, and the like.

In a next step 903, ZZZ may check for an existing entity using a key identifier. If an existing entity is found, in a next step 904, ZZZ may add the existing entity to an existing entity list. Otherwise, in a next step 905, ZZZ may add the first record to a new entity. In an embodiment, ZZZ may include new timeslices objects per attribute for the added first record.

In a next step 906, ZZZ may query an attribute configuration database for one or more attributes to determine if the attribute is organized as a TimeSlices instance or not. In a next step 907, ZZZ may retrieve one or more relevant attribute from the attribute configuration database. In an embodiment, ZZZ may add new timeslices objects for each relevant attribute, as described in step 905. In a next step 908, ZZZ may determine whether date related information for each attribute exists. If it is determined by ZZZ that date related information for each attribute does not exist, in a next step 909, for the observed time information, ZZZ may perform steps 910-912.

In step 910, ZZZ may ingest data at pre-configured (or dynamic) intervals. An example for a possible pre-configured interval can be to collect a current version of the company website corpus on a monthly basis. An example for a dynamic ingestion interval could be to ingest a name update for a given entity, when such a name change is detected by an external data provider. In a next step 911, ZZZ may identify changes based on interval ingestion. Further, in a next step 912, ZZZ may create or update one or more timeslice objects for each relevant attribute. Referring back to step 908, if it is determined by ZZZ that date related information is available for each relevant attribute, ZZZ may create or update one or more timeslice objects for each relevant attribute, as described in step 912.

In a next step 913, the company may be added by ZZZ to the candidate entity database. In a next step 914, ZZZ may receive a next record from a data source and the method 900 may continue to step 903.

FIG. 10 is a flow diagram illustrating an exemplary embodiment comprising the steps of:

In a first step 1001, ZZZ may determine if a timeslices object is available. If it is determined by ZZZ that the timeslices object is available, in a next step 1002, ZZZ may add the timeslices object as the value of a given company attribute.

In a next step 1003, ZZZ may add a start date to the timeslice object. In a next step 1004, ZZZ may add duration of a given first slice as first index. In a next step 1005, ZZZ may calculate duration from timeslices start date to new start date of new data. If a negative duration is calculated by ZZZ, in a next step 1006, ZZZ may update timeslice start date. Further, in a next step 1007, ZZZ may add new slice object. Otherwise, if ZZZ calculates a positive duration ZZZ in a next step 1008. This leads to start A 1101 in FIG. 11. The figure description "'No' path. have an old slice where the new item stops in the middle remaining duration is negative" should be changed accordingly to "'Positive duration path. The new slice starts after the current start date of the timeslices object'".

In a next step 1009, ZZZ may determine whether the duration of the new item is smaller than the negative duration. If it is determined by ZZZ that the duration of the new object is smaller than the negative duration, in a next step 1010, ZZZ may insert a new index in first position with a duration from new start date to duration of the new item. Further, in a next step 1011, ZZZ may add duration of the new item to the negative duration from B01. In a next step 1012, ZZZ may determine whether the duration is still negative. If it is determined by ZZZ that the duration is still negative, in a next step 1013, ZZZ may create and insert new empty slice with index of the absolute value of the remaining negative duration.

Referring back to step 1009, If it is determined by ZZZ that the duration of the new object is not smaller than the negative duration, in a next step 1014, ZZZ may insert a new index in first position with an absolute value of the negative duration from new start date to old start date. Further, in a next step 1015, ZZZ may deduct the value of the index that was added from the duration of the new item.

In a next step 1016, ZZZ may deduct the duration from added index from the total duration of the new item to calculate a remaining duration.

FIG. 11 is a flow diagram illustrating an exemplary embodiment comprising the steps of:

In a first step 1101, the process is continued that has been illustrated in FIG. 10 until step 1008. That is, the duration from the timeslices start date to the start date of the new data is positive.

In a next step 1102, ZZZ may iterate through the old indices (for each old index). In a next step 1103, ZZZ may deduct the current old index from the remaining duration. In a next step 1104, ZZZ may determine whether the remaining duration is greater than or equal to zero. If it is determined by ZZZ that the remaining duration is greater than or equal to zero, in a next step 1105, ZZZ may add the new item to the current old slice that refers to the current old index. Further, in a next step 1106, ZZZ may determine whether the remaining duration is greater than zero in the new item. If it is determined by ZZZ that the remaining duration is not greater than zero, in a next step 1107, method 1100 stops. Otherwise, in a next step 1108, ZZZ may determine whether the current old index is a last old index. If ZZZ determines that the current old index is the last old index, in a next step 1109, ZZZ may further determine whether the start of the new item has been reached. If it is determined by ZZZ that the start of the new item has not been reached, in a next step 1110, ZZZ may add empty slice with index of the index of the difference between the old end date and the new item start date. Otherwise, in a next step 1111, ZZZ may add a new slice with the new item's data and the remaining duration of the new item.

Referring back to step 1104, if it is determined by ZZZ that the remaining duration is not greater than or equal to zero, in a next step 1112, ZZZ may reduce the current old index to its old value minus the remaining new item's duration. Further, in a next step 1113, ZZZ insert a copy of the old slice with the remaining duration of the new item before the old slice. Finally, in a next step 1114, ZZZ may add new data to the copied slice.

FIG. 12 is a flow diagram illustrating an exemplary embodiment comprising the steps of:

In a first step 1201, ZZZ may iterate through the old indices for each old index. In a next step 1202, ZZZ may deduct the current old index from the difference of the start date of the current slice to the start date of new item start date. Further, in a next step 1203, ZZZ may determine whether the difference after deducting current old index is greater than or equal to zero. If it is determined by ZZZ that the difference is greater than or equal to zero, in a next step 1204, ZZZ may keep current old slice index unchanged.

In a next step 1205, ZZZ may determine whether the current old index is the last old index. If the current old index is not the last old index, the method 1100 continues to step 1201. Otherwise, in a next step 1206, ZZZ may determine whether the start of the new item has been reached. If it is determined by ZZZ that the start of the new item has not been reached, in a next step 1207, ZZZ may add empty slice with index of the index of the difference between the old end date and the new item start date. Otherwise, in a next step 1208, ZZZ may add a new slice with the new item's data and the remaining duration of the new item.

Referring back to step 1203, if it is determined by ZZZ that the difference is not greater than or equal to zero, in a next step 1209, ZZZ may reduce the current old index to its old value minus the difference after deducting current old index c202. Further, in a next step 1210, ZZZ may insert a copy of the old slice with c202 difference after the old slice. In a next step 1211, ZZZ may add new data to the copied slice. In a next step 1212, ZZZ may deduct the c202 from the new items' duration.

In an embodiment, in a next step 1213, ZZZ may determine whether the remaining duration is greater than zero in the new item. If it is determined that the remaining duration is not greater than zero, in a next step 1214, method 1200 stops. Otherwise, method 1200 continues to step 1215.

FIGS. 13A-B illustrate a flow diagram illustrating an exemplary embodiment comprising the steps of:

In a first step 1301, ZZZ may input attribute values. In a next step 1302, ZZZ may tokenize the given attribute value with a customized tokenizer. Tokenization is a process common in natural language processing in which the input String is broken down into sub-components called tokens. Tokens may be words, characters or n-grams. In the embodiment, the tokenizer returns a collection of distinct word tokens. Common abbreviations may be resolved, such as "ltd."→"limited". In a next step 1303, ZZZ may determine based on the attribute type whether the returned tokens can be categorized into components. For example, a company name may be comprised of components, such as a base name and a legal identifier, such as "limited". If it is determined by ZZZ that the attribute tokens may form distinct components, in a next step 1304, ZZZ may initiate a CRF classifier (hidden markov) to identify and classify distinct components. In a next step 1305, ZZZ may determine if the attribute value or its distinct components, if applicable, need fingerprinting. If fingerprinting is required, in a next step 1306, the attribute value is fed to a fingerprinter to generate fingerprints in a next step 1307. The fingerprints may be saved in a fingerprints database in step 1308. Further, in a next step 1309, candidate pairs are yielded.

Otherwise, in a next step 1310, ZZZ may determine whether token needs semantic embedding. If it is determined by ZZZ that token needs semantic embedding, in a next step 1311, ZZZ may initiate a customized semantic embedding. Further, in a next step 1312, embeddings may be generated. Otherwise, in a next step 1313, ZZZ may determine whether attribute is a location. If it is determined that the attribute is a location, in a next step 1314, ZZZ may determine associated geocodes and store the geocodes in step 1315.

Referring now to FIG. 13B, for each candidate company, overlapping months may be identified in step 1320. In a next step 1321, a pair of corresponding timeslices may be prepared. In a next step 1322, the timeslices maybe fed to comparator. For each comparator feature, in a next step 1323, the feature may be inputted to a vectorizer 1323. In a next step 1324, distance vector may be generated.

In a next step 1325, and N×T matrix is generated. Further, for each input matrix, CNN in step 1326. In step 1327, it is determined whether a same entity is represented. If yes, in a next step 1328, the entities are merged. Otherwise, in a next step 1329, these are unconnected.

FIG. 14A-B are block diagrams illustrating a plurality of entity elements time-sliced over a period of time, in accordance with a preferred embodiment of the invention.

The skilled person will be aware of a range of possible modifications of the various embodiments described above. Accordingly, the present invention is defined by the claims and their equivalents.

What is claimed is:

1. A system for disambiguating company profiles, the system comprising:
   an entity disambiguation computer comprising a memory, a processor, and a plurality of programming instructions, the plurality of programming instructions when executed by the processor cause the processor to:
   receive a plurality of candidate company profiles with timed attributes from a database;
   monitor the plurality of received candidate company profiles, and extract and ingest at dynamic intervals, a plurality of timed metadata from the plurality of candidate company profiles, the timed metadata comprising individual company data, each timed metadata, of the plurality of timed company profiles, linked to a company profile, of the plurality of the candidate company profiles, associated to a time frame, wherein the individual company data for a company profile comprises, at least location, geocodes, company name, employee attributes, average company headcount reporting data over a given time frame, company website and URL information, and company employment records;
   disambiguate, from at least a portion of timed metadata, a plurality of locations and geocodes, for the time frame, using regular expressions to match components of unstructured text and cross-reference one or more identified location components against one or more geocode databases;
   classify and disambiguate, from at least a portion of timed metadata, a company name component, for the time frame, from a company name associated with at least one company profile, of the plurality of candidate company profiles, to identify at least a base name, a connector, a function and/or industry, and a legal identifier associated with the company name, wherein a conditional random field (CRF) is used to disambiguate the company name component;
   disambiguate, from at least a portion of timed metadata, employee attributes, for the time frame, by mapping skills to skill topics implemented with a Latent Dirichlet Allocation (LDA) topic model algorithm;
   train a tree model for pre-selection of a plurality of candidate companies for the first company profile, wherein one or more manually annotated training examples are used to train the tree model, so as to facilitate identification of a pre-selection of the plurality of candidate companies, wherein one or more manually annotated training examples are used to train the tree model, so as to facilitate identification of a pre-selection of the plurality of candidate companies, and wherein one or more algorithms used to train the tree model include Random Forrest algorithm, Gradient Boosting algorithm, Decision Tree algorithm, or a combination thereof;
   train a similarity model for comparison of the plurality of candidate companies based at least on the pre-selection of the plurality of candidate companies, wherein the similarity model is trained to determine whether two given candidate companies are the same, wherein the similarity model is trained using one of a Regression Algorithm, a Neural Network, or a Vector Similarity Algorithm paired with a learned threshold model; and
   in response to a determination that at least two given candidate companies, of the plurality of candidate companies are matched, merge the timed metadata associated with the matched candidate companies.

* * * * *